(12) United States Patent
Berggren et al.

(10) Patent No.: US 10,159,186 B2
(45) Date of Patent: Dec. 25, 2018

(54) CORN HARVESTER WITH TALL CORN ATTACHMENT AND AUGER AND ASSOCIATED METHODS

(71) Applicant: CNH Industrial America LLC, New Holland, PA (US)

(72) Inventors: Michael Lee Berggren, Davenport, IA (US); James Michael Gessel, Geneseo, IL (US); Zachary Long, Harleysville, PA (US); Andrew Lauwers, Sandusky, OH (US); Vijayashankar Rajalingam, Pune (IN)

(73) Assignee: CNH Industrial America, LLC, New Holland, PA (US)

( * ) Notice: Subject to any disclaimer, the term of this patent is extended or adjusted under 35 U.S.C. 154(b) by 108 days.

(21) Appl. No.: 15/249,334

(22) Filed: Aug. 26, 2016

(65) Prior Publication Data

US 2018/0054969 A1    Mar. 1, 2018

(51) Int. Cl.
*A01D 45/02* (2006.01)
*A01D 63/02* (2006.01)

(52) U.S. Cl.
CPC .......... *A01D 45/021* (2013.01); *A01D 63/02* (2013.01)

(58) Field of Classification Search
CPC ...... A01D 45/021; A01D 63/04; A01D 63/02; A01D 45/02; A01D 57/22; A01D 63/00; A01D 65/00
See application file for complete search history.

(56) References Cited

U.S. PATENT DOCUMENTS

| 771,354 | A | 10/1904 | Danciger |
| 925,863 | A | 6/1909 | Braun |
| 1,033,088 | A | 7/1912 | Downing |
| 1,172,033 | A | 2/1916 | Mueller |
| 1,219,327 | A * | 3/1917 | Keeler ................. A01D 45/021 56/106 |
| 1,306,317 | A * | 6/1919 | St. John ............... A01D 45/021 56/111 |
| 1,380,389 | A | 6/1921 | Kile |
| 1,846,453 | A | 2/1932 | Pearson |
| 1,859,208 | A | 5/1932 | Kane |
| 2,133,905 | A * | 10/1938 | Rund, Jr. ................ A01D 65/02 172/517 |
| 2,648,944 | A | 8/1953 | Powers |

(Continued)

FOREIGN PATENT DOCUMENTS

| DE | 3231953 A1 * | 3/1984 | ............ A01D 45/02 |
| DE | 3414576 A1 | 10/1985 | |
| EP | 3132667 A1 | 2/2017 | |

OTHER PUBLICATIONS

European Search Report for European Application No. 17187799.6, dated Jan. 24, 2018 (5 pages).

*Primary Examiner* — Arpad Fabian-Kovacs
(74) *Attorney, Agent, or Firm* — Peter K. Zacharias; Patrick M. Sheldrake

(57) ABSTRACT

A corn harvester that includes a corn head including a plurality of dividers is provided. Each divider includes a hood with a top surface, and first and second side surfaces, one of the first or second side surfaces including a recessed area formed therein. The corn harvester includes an auger mounted to the hood. The auger is configured to be powered to rotate about an auger central axis. The corn harvester includes a tall corn attachment mounted to the hood and configured to be positioned in a stored position or a working position. In the stored position, the tall corn attachment is received within the recessed area of the hood. In the working position, the tall corn attachment extends from the top surface of the hood and at least partially covers a radial section of the auger.

20 Claims, 23 Drawing Sheets

(56) References Cited

U.S. PATENT DOCUMENTS

| | | | |
|---|---|---|---|
| 2,751,744 A * | 6/1956 | Reade | A01D 45/021 |
| | | | 56/119 |
| 3,135,083 A | 6/1964 | Czajkowski | |
| 3,736,734 A | 6/1973 | Pavel | |
| 4,346,548 A | 8/1982 | Atkinson | |
| 4,377,062 A | 3/1983 | Slattery | |
| 4,385,484 A | 5/1983 | Ehrhart et al. | |
| 5,444,968 A * | 8/1995 | Barton | A01D 45/021 |
| | | | 56/119 |
| 5,761,893 A | 6/1998 | Lofquist et al. | |
| 5,775,076 A | 7/1998 | Mossman | |
| 5,865,019 A | 2/1999 | Hurlburt et al. | |
| 6,901,730 B1 * | 6/2005 | Buresch | A01D 63/04 |
| | | | 56/314 |
| 7,681,387 B2 | 3/2010 | Guldenpfennig et al. | |
| 7,752,829 B1 * | 7/2010 | Rottinghaus | A01D 45/021 |
| | | | 56/110 |
| 8,726,623 B2 | 5/2014 | Kiel et al. | |
| 9,603,304 B2 * | 3/2017 | Lambertini | A01D 45/021 |
| 2004/0107685 A1 * | 6/2004 | Resing | A01D 63/02 |
| | | | 56/119 |
| 2004/0231309 A1 * | 11/2004 | Rickert | A01D 63/02 |
| | | | 56/119 |
| 2005/0126151 A1 | 6/2005 | Buresch et al. | |
| 2011/0028193 A1 * | 2/2011 | Murray | A01D 41/1243 |
| | | | 460/111 |
| 2011/0277436 A1 * | 11/2011 | Allochis | A01D 63/02 |
| | | | 56/109 |
| 2014/0150394 A1 * | 6/2014 | Calmer | A01D 45/021 |
| | | | 56/106 |
| 2015/0121831 A1 * | 5/2015 | Noll | A01D 63/04 |
| | | | 56/249 |
| 2016/0324072 A1 * | 11/2016 | Long | A01D 45/021 |
| 2017/0049056 A1 * | 2/2017 | Wenger | A01D 57/06 |

\* cited by examiner

FIG. 22

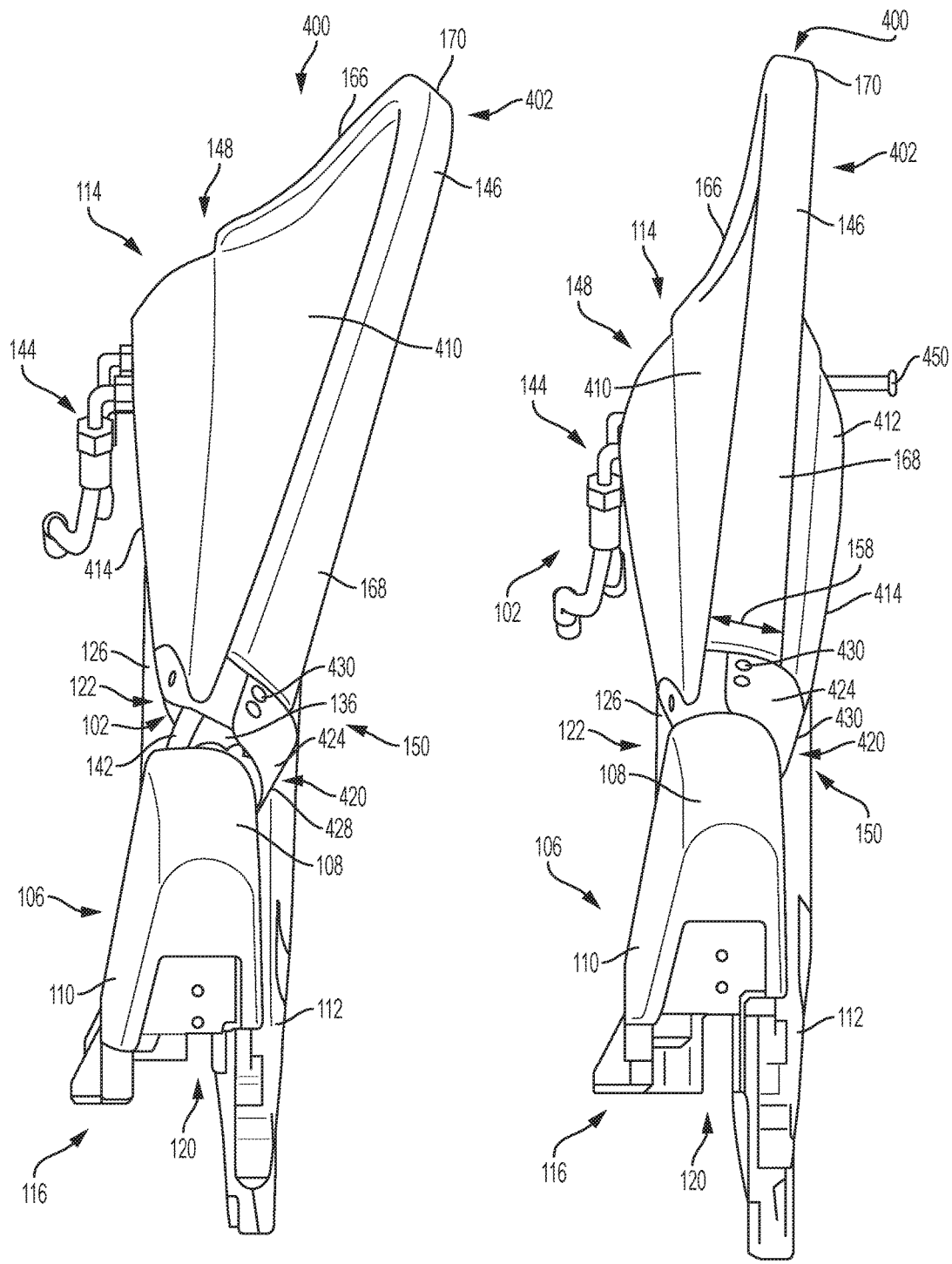

CORN HARVESTER WITH TALL CORN ATTACHMENT AND AUGER AND ASSOCIATED METHODS

BACKGROUND

Harvesters are used in the agricultural industry to harvest a variety of crops, including corn. Corn harvesters generally include a corn head with dividers and collection mechanisms configured to collect corn from the field. For example, FIG. 1 shows a traditional corn harvester 10 including a corn head 12 with a plurality of dividers 14. The corn harvester 10 can include a transverse auger 16 disposed behind the dividers 14. Attachments can be mounted to the divider to assist in guiding tall corn stalks into the collection mechanism. For corn stalks that have fallen or are located near the ground, powered augers are mounted to the divider to assist in collection. For example, FIG. 2 shows a traditional corn head 50 including a plurality of dividers 52 with augers 54 mounted to the end dividers 52.

Mounting an attachment or a powered auger can be time-consuming due to the necessity of bolting multiple components to the divider. Further, powered augers cannot be mounted to the divider simultaneously with mounting of the attachment, thereby necessitating a significant amount of labor to interchange the components when harvesting corn stalks of different heights and at different locations relative to the ground.

SUMMARY

Exemplary embodiments are directed to corn harvesters including a tall corn attachment and an auger simultaneously mounted to a divider of a corn head. The auger is mounted to the divider for harvesting fallen or low corn stalks, while the tall corn attachment is rotatably mounted to the divider. In particular, the tall corn attachment can be rotated between a stored position (e.g., when the auger is being used) and a working position (e.g., when the tall corn attachment is being used) without the necessity of interchanging and mounting various components. Thus, the tall corn attachment can be conveniently and efficiently positioned between a working and non-working position depending on the needs of the user.

In accordance with embodiments of the present disclosure, an exemplary corn harvester is provided. The corn harvester includes a corn head including a plurality of dividers. Each divider includes a hood with a top surface, first and second side surfaces, a proximal end and a distal end. One of the first or second side surfaces includes a recessed area formed therein. The corn harvester includes an auger mounted to the hood. The auger is configured to be powered to rotate about an auger central axis. The corn harvester includes a tall corn attachment mounted to the hood and configured to be positioned in a stored position or a working position. In the stored position, the tall corn attachment is received within the recessed area of the hood. In the working position, the tall corn attachment extends from the top surface of the hood and at least partially covers a radial section of the auger. The tall corn attachment includes a latching mechanism for locking the tall corn attachment in the stored position or the working position.

The recessed area of the hood can be substantially complementary to the configuration of the tall corn attachment. The recessed area of the hood includes a planar side wall offset from a central longitudinal axis of the hood and extending between the proximal and distal ends of the hood. The recessed area further includes a front planar wall located near the distal end of the hood. A distal end of the auger can be mounted to the front planar wall of the recessed area of the hood and a proximal end of the auger can be mounted to the top surface of the hood.

In the working position, a pivot axis of the tall corn attachment can be substantially aligned with the auger central axis and a bottom surface of the tall corn attachment can be disposed over the auger. In the stored position, the pivot axis of the tall corn attachment can be substantially aligned with the auger central axis and a bottom surface of the tall corn attachment can be disposed below the auger. In some embodiments, the auger can be configured to automatically stop rotating when the tall corn attachment is positioned in the working position.

The latching mechanism can include a pin (e.g., a spring-loaded pin or a manually actuated pin) extending from a proximal end of the tall corn attachment. The pin configured to be received in an aperture formed in a mounting bracket secured to the top surface of the hood to define a proximal pivot point. The proximal pivot point being located along a pivot axis of the tall corn attachment. In some embodiments, the tall corn attachment can be detachably mounted to the hood.

In some embodiments, the auger can include a shaft extending along the auger central axis. The tall corn attachment can include a distal mounting flange extending from a bottom surface of the tall corn attachment and a proximal mounting flange extending from the bottom surface of the tall corn attachment. The tall corn attachment can be rotatably and non-detachably mounted to the shaft of the auger by the distal and proximal mounting flanges such that the auger extends between the distal and proximal mounting flanges.

In some embodiments the tall corn attachment can include a leading edge extending between a proximal end and a distal end of the tall corn attachment, a base, and first and second side surfaces. The leading edge can define a curved surface tapering from a first width at the distal end to a second width at the proximal end, the first width being dimensioned greater than the second width. In some embodiments, each of the first and second side surfaces can taper outwardly from the leading edge to the base. In some embodiments, each of the first and second side surfaces can include one or more indented louvers formed therein.

In some embodiments, the tall corn attachment can include a pivot axis extending parallel and offset from a bottom surface of the tall corn attachment. The tall corn attachment can include a proximal leading edge portion and a distal leading edge portion connected by a rounded leading edge top portion. The proximal leading edge portion and the distal leading edge portion can extend at angles relative to the pivot axis, the angle of the proximal leading edge portion being greater than the angle of the distal leading edge portion. In some embodiments, the tall corn attachment can include a groove formed offset from and extending parallel to the proximal leading edge. The groove being configured and dimensioned to receive at least a portion of a hand of a user.

In accordance with embodiments of the present disclosure, an exemplary corn harvester is provided that can function without an auger. The corn harvester includes a corn head including a plurality of dividers. Each divider includes a hood with a top surface, first and second side surfaces, a proximal end and a distal end. One of the first or second side surfaces includes a recessed area formed therein. The corn harvester includes a tall corn attachment mounted to the hood and configured to be positioned in a stored position or a working position. In the stored position, the tall corn attachment is received within the recessed area of the hood. In the working position, the tall corn attachment extends from the top surface of the hood. The tall corn attachment includes a latching mechanism for locking the tall corn attachment in the stored position or the working position.

In accordance with embodiments of the present disclosure, an exemplary corn harvester divider is provided. The divider includes a hood with a top surface, first and second side surfaces, a proximal end and a distal end. One of the first or second side surfaces includes a recessed area formed therein. The divider includes an auger mounted to the hood. The auger can be configured to be powered to rotate about an auger central axis. The divider includes a tall corn attachment mounted to the hood and configured to be positioned in a stored position or a working position.

In the stored position, the tall corn attachment is received or substantially received within the recessed area of the hood. In the working position, the tall corn attachment extends from the top surface of the hood and at least partially covers a radial section of the auger. The tall corn attachment can include a latching mechanism for locking the tall corn attachment in the stored position or the working position.

In accordance with embodiments of the present disclosure, an exemplary corn harvester divider is provided that can function without an auger. The divider includes a hood with a top surface, first and second side surfaces, a proximal end and a distal end. One of the first or second side surfaces includes a recessed area formed therein. The divider includes a tall corn attachment mounted to the hood and configured to be positioned in a stored position or a working position. In the stored position, the tall corn attachment is received or substantially received within the recessed area of the hood. In the working position, the tall corn attachment extends from the top surface of the hood. The tall corn attachment can include a latching mechanism for locking the tall corn attachment in the stored position or the working position.

In accordance with embodiments of the present disclosure, an exemplary method of operating a corn harvester is provided. The method includes providing a corn head including a plurality of dividers. Each divider includes a hood with a top surface, first and second side surfaces, a proximal end and a distal end, one of the first or second side surfaces including a recessed area formed therein. The method includes mounting an auger to the hood. The auger can be configured to be powered to rotate about an auger central axis. The method includes mounting a tall corn attachment to the hood.

The method also includes positioning the tall corn attachment in a stored position. In the stored position, the tall corn attachment is received within the recessed area of the hood. The method further includes positioning the tall corn attachment in a working position. In the working position, the tall corn attachment extends from the top surface of the hood and at least partially covers a radial section of the auger. The tall corn attachment can include a latching mechanism for locking the tall corn attachment in the stored position or the working position.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed corn harvesters and associated system and methods, reference is made to the accompanying figures, wherein:

FIG. 22 is a front view of an exemplary divider of FIG. 17 including an auger and a detachable tall corn attachment in a disassembled arrangement;

FIG. 23 is a front view of an exemplary divider of FIG. 17 including an auger and a detachable tall corn attachment in a disassembled arrangement;

FIG. 24 is a front view of an exemplary divider of FIG. 17 including an auger and a detachable tall corn attachment in an assembled arrangement;

DETAILED DESCRIPTION

It should be understood that the relative terminology used herein, such as "front", "rear", "left", "top", "bottom", "vertical", "horizontal", "up" and "down" is solely for the purposes of clarity and designation and is not intended to limit embodiments to a particular position and/or orientation. Accordingly, such relative terminology should not be construed to limit the scope of the present disclosure. In addition, it should be understood that the scope of the present disclosure is not limited to embodiments having specific dimensions. Thus, any dimensions provided herein are merely for an exemplary purpose and are not intended to limit the invention to embodiments having particular dimensions.

Figure 1:
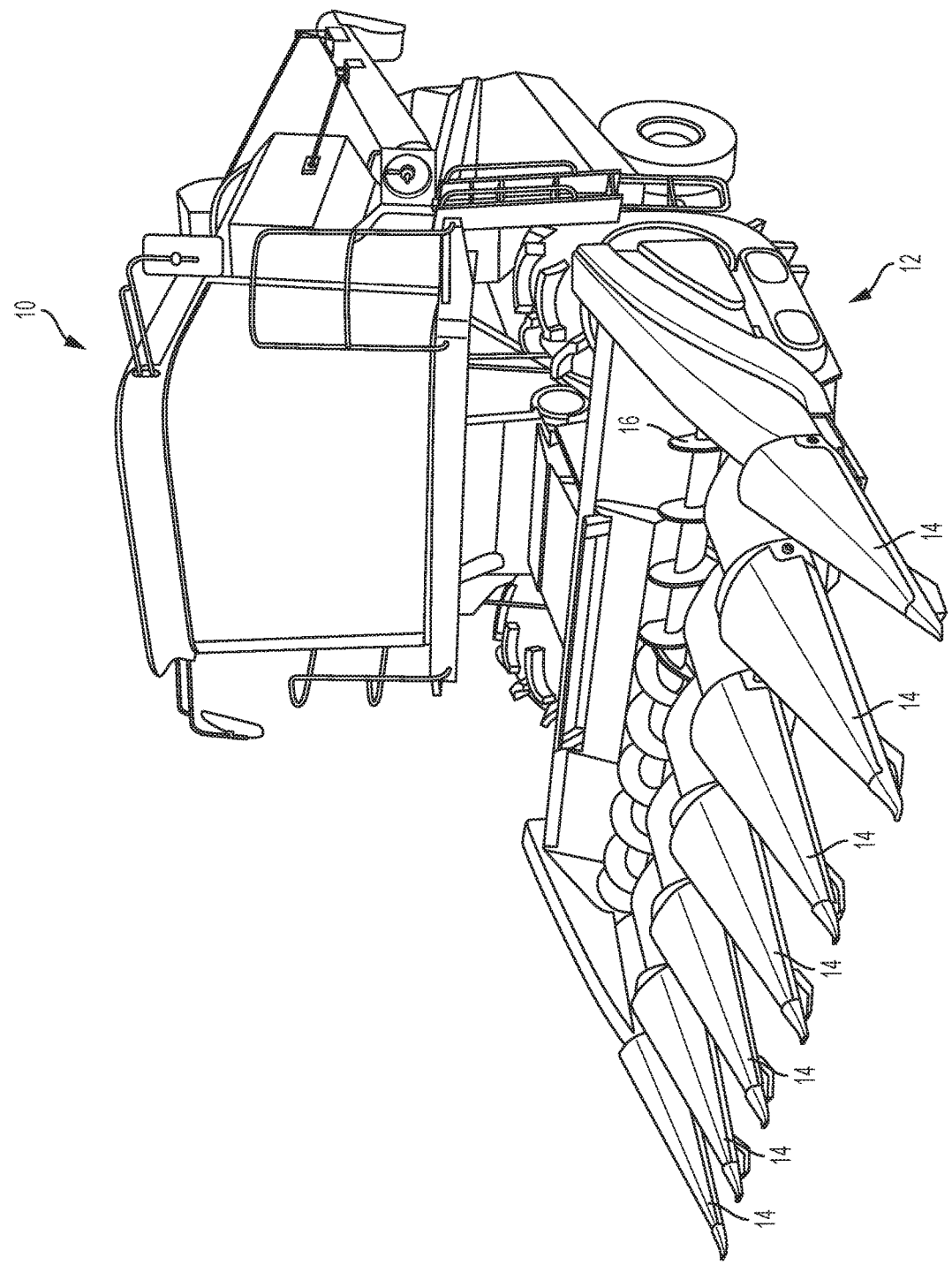
FIG. 1 is a perspective view of a traditional corn harvester.
Figure 2:
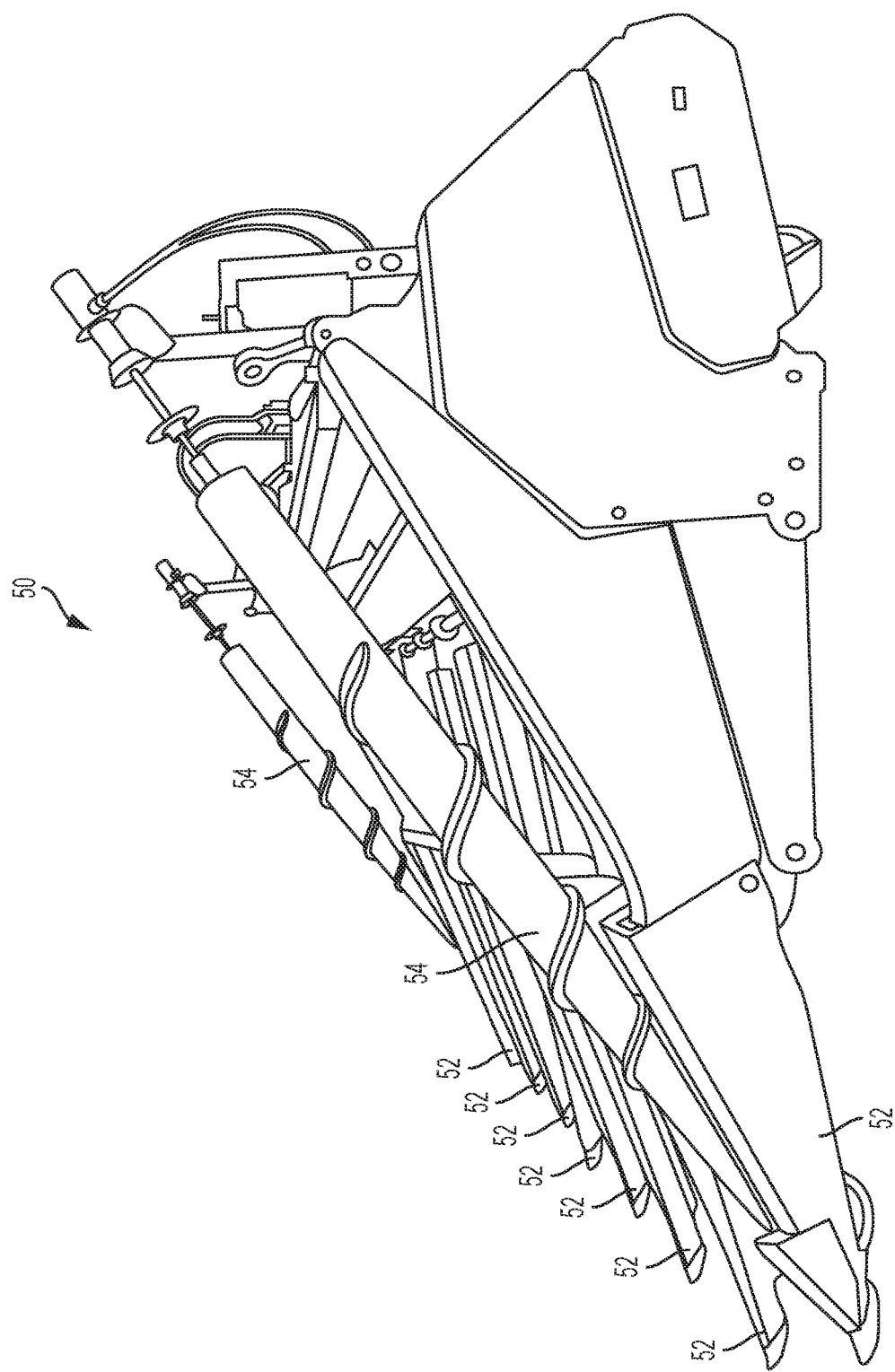
FIG. 2 is a side view of a traditional corn head of a corn harvester.
Figure 3:
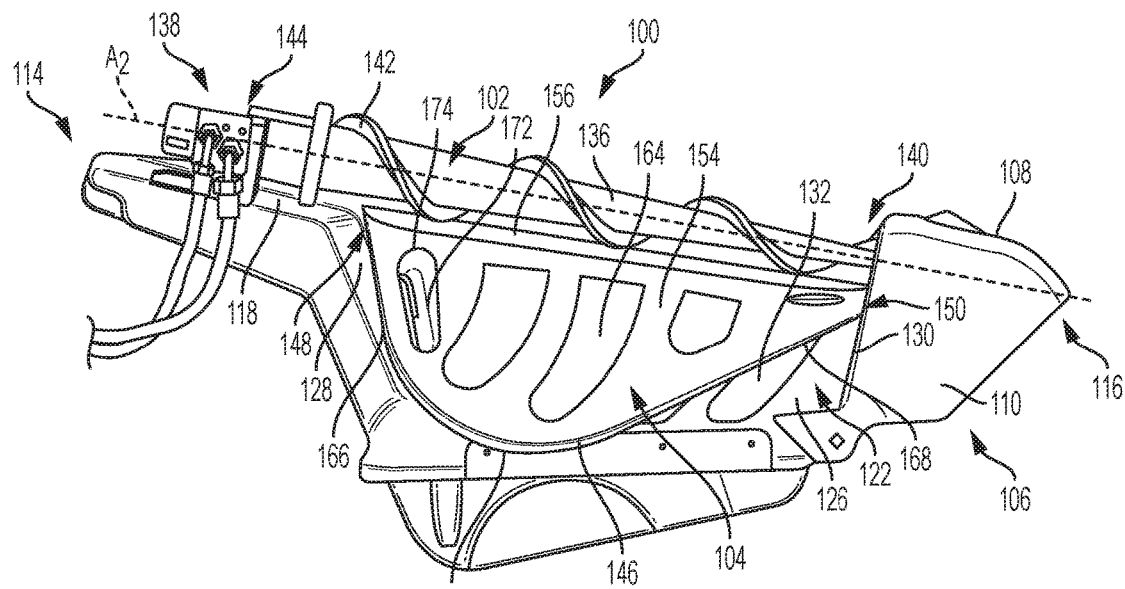
FIG. 3 is a side view of an exemplary divider of the present disclosure including an auger and a detachable tall corn attachment, the tall corn attachment being in a stored position.
Figure 4:
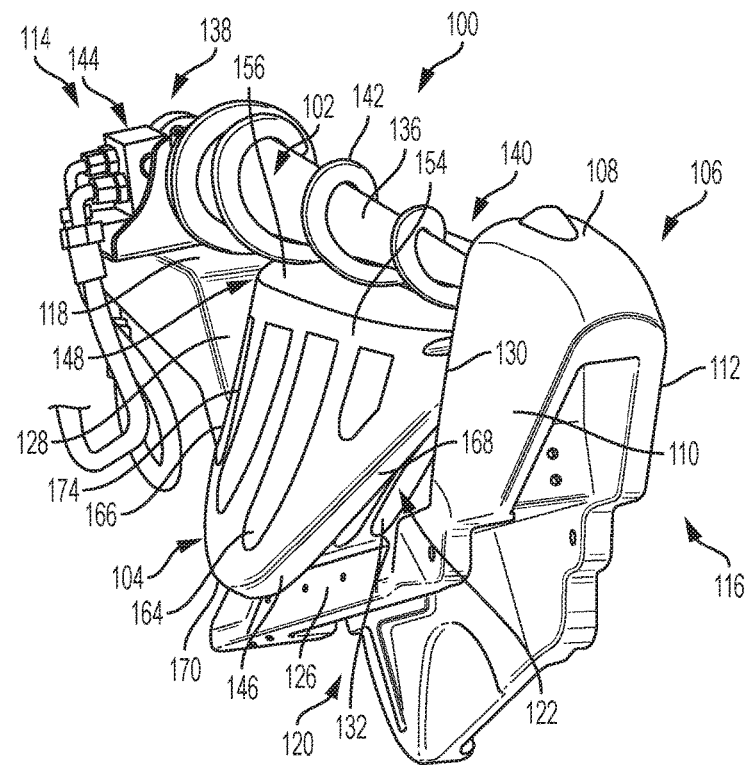
FIG. 4 is a front, perspective view of an exemplary divider of FIG. 3 including a detachable tall corn attachment in a stored position.

FIGS. 3-8 show perspective, side and front views of an exemplary divider 100 including an auger 102 and a detachable tall corn attachment 104. In particular, FIGS. 3-8 show the tall corn attachment 104 positioned in a stored position and a working position. It should be understood that the exemplary divider 100 can be incorporated into a traditional corn head (e.g., the corn head 10 shown in FIG. 1) to improve the corn harvesting process. In addition, the divider 100 can be incorporated into any traditional corn heads, such as corn heads that include a fender or hood extension for guiding ears of corn that can bounce over the divider, or corn heads that include a fender or hood configured to tilt upwards to provide access to the collection mechanism to repair blockages in the collection mechanism, such as the corn heads disclosed in U.S. Pat. Nos. 5,775,076 and 7,681,387, which are incorporated herein by reference.

The divider 100 generally includes a hood 106 that includes a distal top surface 108, a first side surface 110, a second side surface 112, a proximal end 114, a distal end 116, and a proximal top surface 118. The distal top surface 108 can define a rounded or curved configuration, while the proximal top surface 118 can define a substantially flat or planar configuration. In some embodiments, the first side surface 110 can be angled relative to a vertical plane, while the second side surface 112 can be substantially parallel to a vertical plane. The walls or surfaces of the divider 100 can define one or more hollow cavities 120 therebetween (e.g., on an inner, bottom surface) that includes features for mounting the divider 100 on the corn head.

The hood 106 includes a recessed area 122 formed in one of the first or second side surfaces 110, 112 (e.g., the first side surface 110 as shown in FIGS. 3-8). In particular, the recessed area 122 can extend between the distal and proximal top surfaces 108, 118. The configuration and dimensions of the recessed area 122 can be such that the recessed area 122 is substantially complementary to the tall corn attachment 104 and can at least partially receive the tall corn attachment 104 in the stored position. The recessed area 122 includes a planar inner side wall 124 that is offset from a central longitudinal axis $A_1$ (e.g., the recessed area 122 is not symmetrically formed in the hood 106). The planar inner side wall 124 can define a triangular configuration tapering from the proximal end 114 to the distal end 116.

The recessed area 122 further includes an angled lower surface 126 extending from the planar inner side wall 124, a rear planar wall 128 and a front planar wall 130. The rear planar wall 128, the lower surface 126 and the front planar wall 130 form a substantially U-shaped cavity with the rear planar wall 128 and the front planar wall 130 extending outwardly from the lower surface 126. The rear planar wall 128 transitions into the proximal top surface 118. In some embodiments, the lower surface 126 can include one or more louvers 132 formed therein. The louvers 132 are formed as indentations within the lower surface 126, and assist in guiding loose corn kernels into the collection mechanism of the harvester as the harvester moves along a field.

Figure 5:
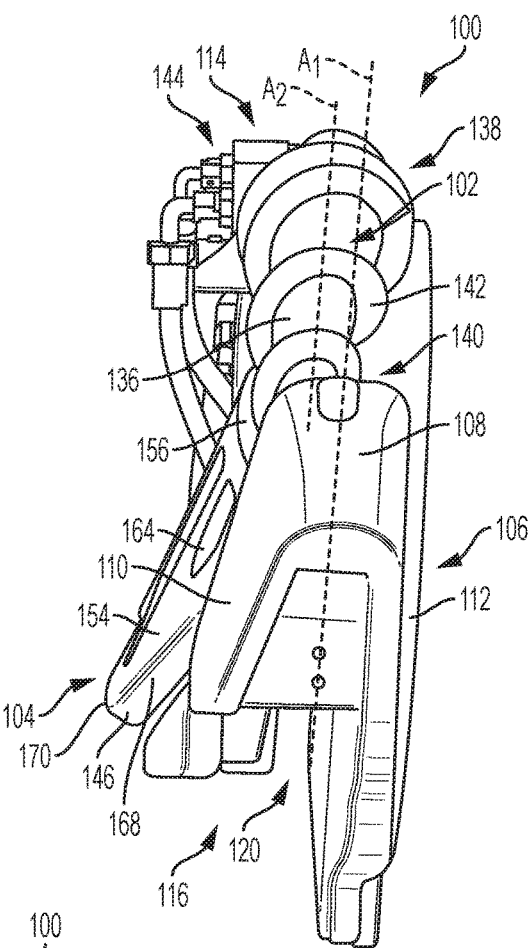
FIG. 5 is a front view of an exemplary divider of FIG. 3 including a detachable tall corn attachment in a stored position.
Figure 6:
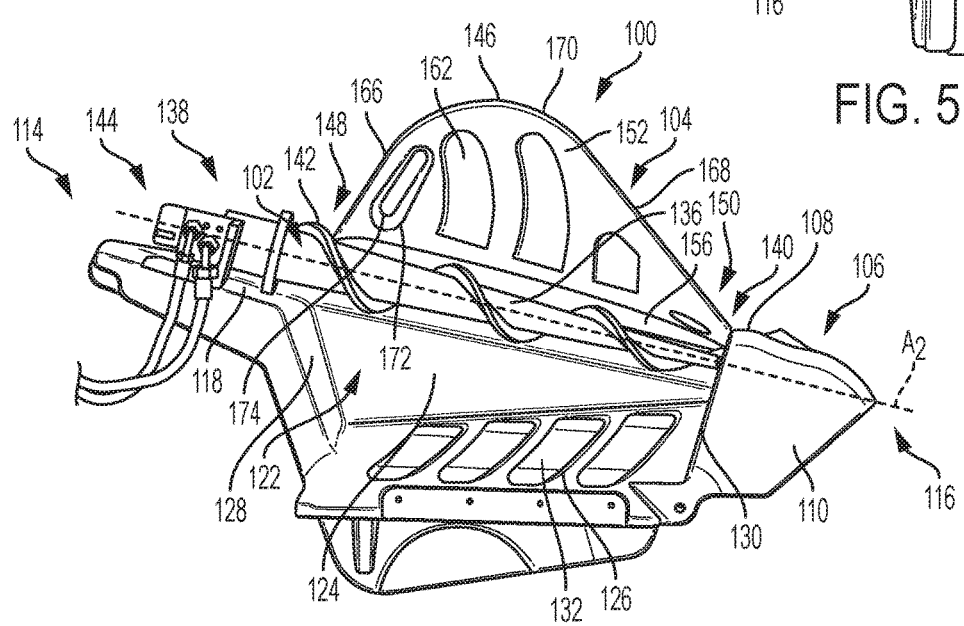
FIG. 6 is a side view of an exemplary divider of FIG. 3 including a detachable tall corn attachment in a working position.
Figures 7, 8:
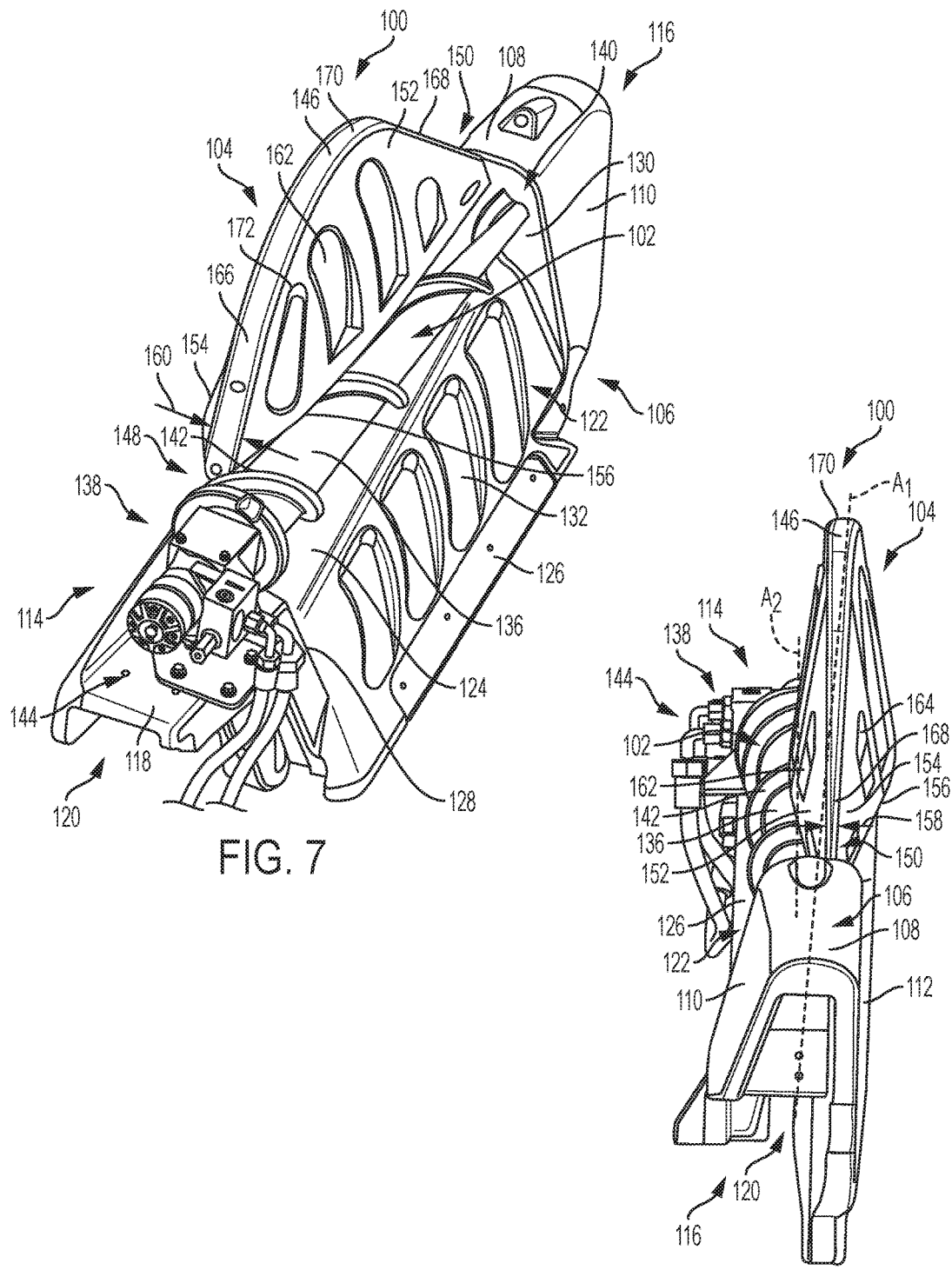
FIG. 7 is a rear, perspective view of an exemplary divider of FIG. 3 including a detachable tall corn attachment in a working position.
FIG. 8 is a front view of an exemplary divider of FIG. 3 including a detachable tall corn attachment in a working position.
Figure 9:
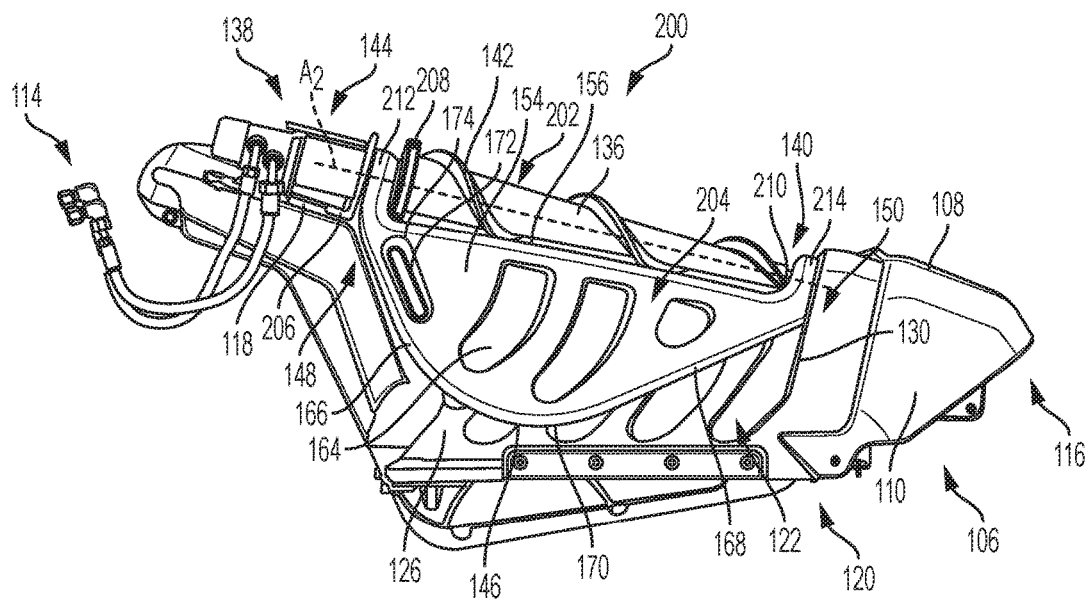
FIG. 9 is a side view of an exemplary divider of the present disclosure including an auger and a non-detachable tall corn attachment, the tall corn attachment being in a stored position.
Figure 10:
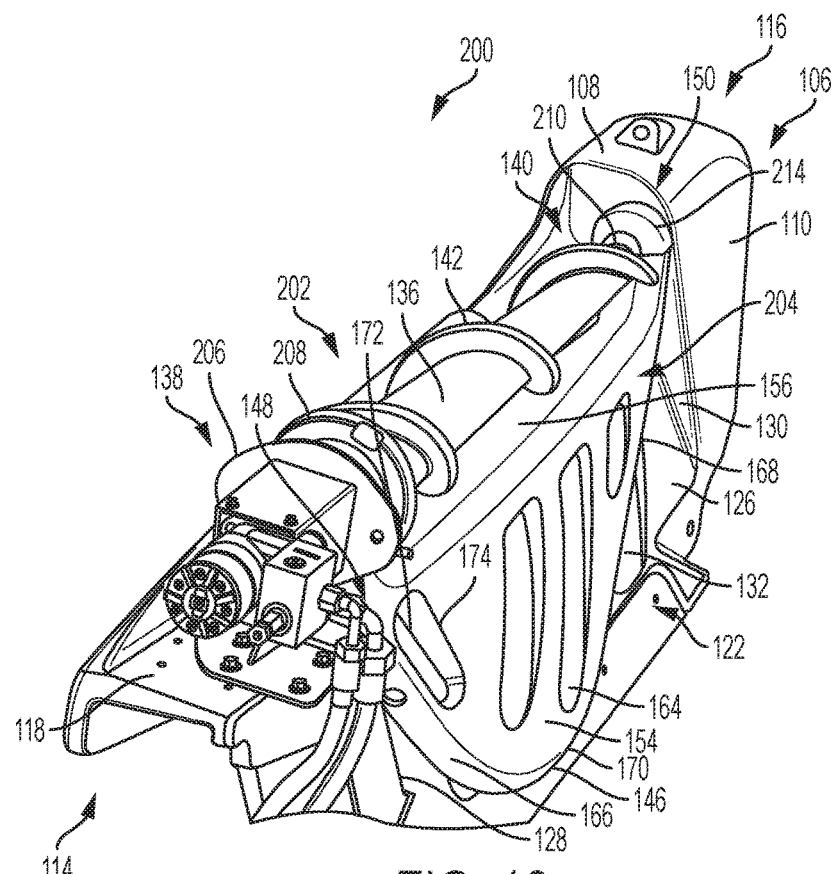
FIG. 10 is a rear, perspective view of an exemplary divider of FIG. 9 including a non-detachable tall corn attachment in a stored position.
Figures 11, 12:
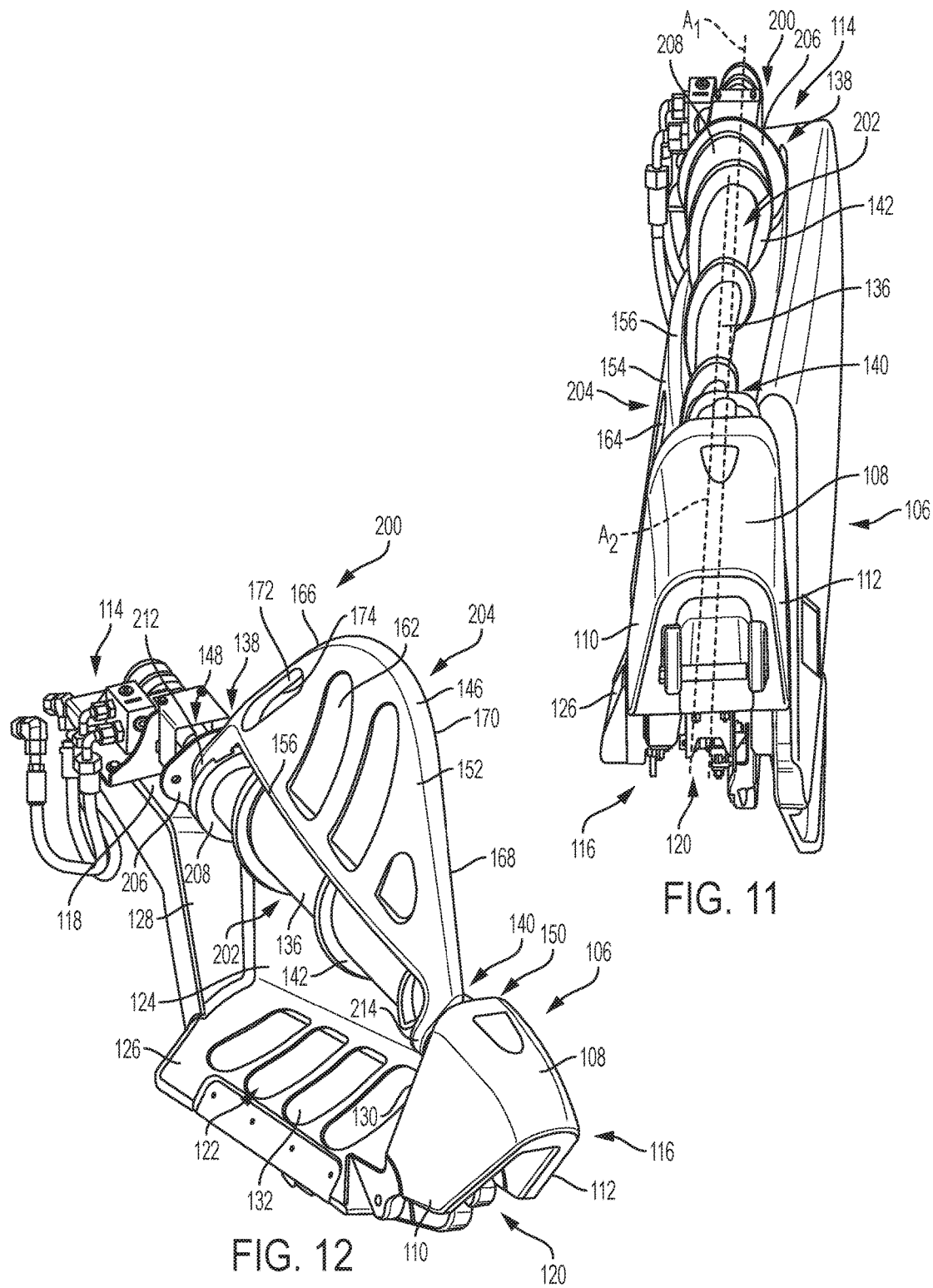
FIG. 11 is a front view of an exemplary divider of FIG. 9 including a non-detachable tall corn attachment in a stored position.
FIG. 12 is a front, perspective view of an exemplary divider of FIG. 9 including a non-detachable tall corn attachment in a working position.
Figure 13:
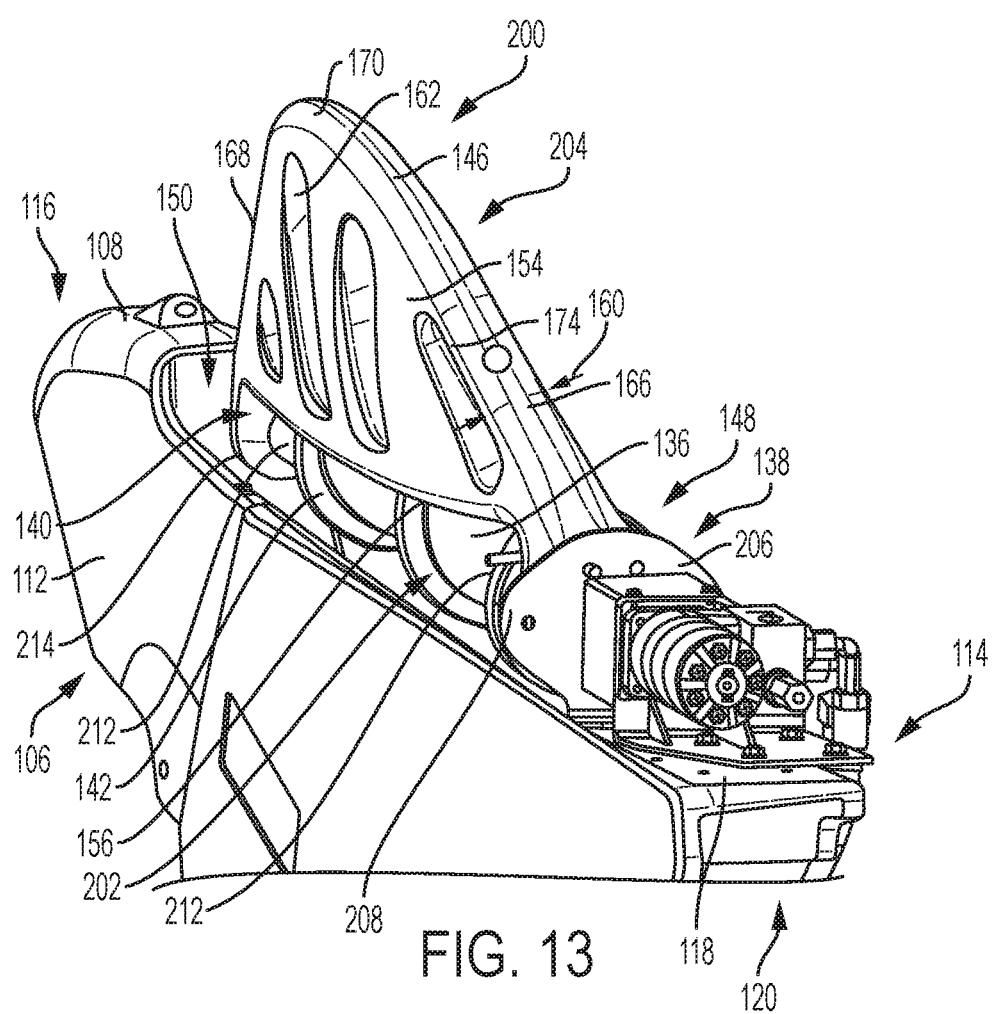
FIG. 13 is a rear, perspective view of an exemplary divider of FIG. 9 including a non-detachable tall corn attachment in a working position.
Figure 14:
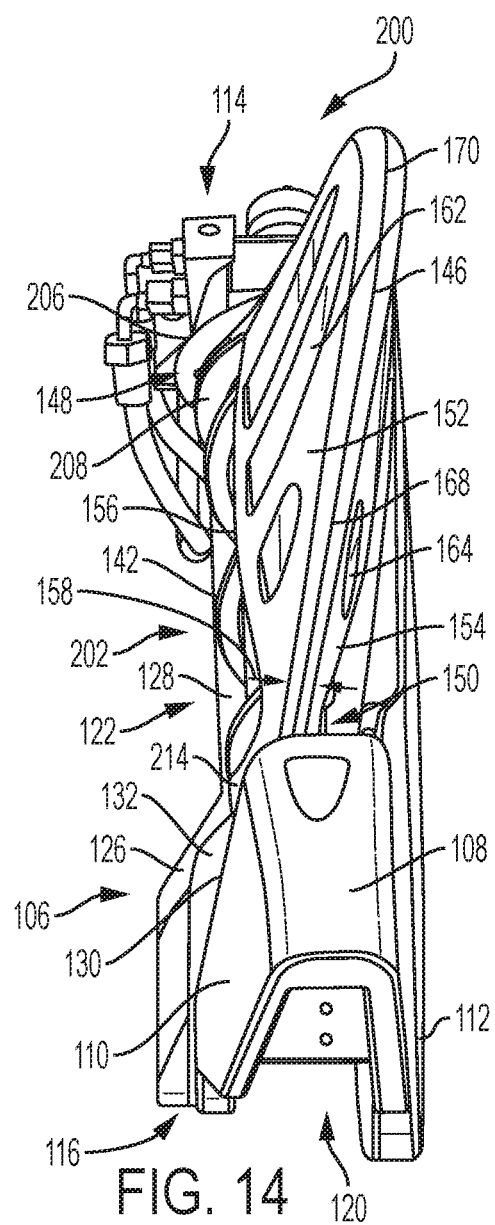
FIG. 14 is a front view of an exemplary divider of FIG. 9 including a non-detachable tall corn attachment in a working position.

The auger 102 generally includes a central shaft 136 that tapers from a proximal end 138 of the auger 102 to a distal end 140 of the auger 102, the diameter of the central shaft 136 being dimensioned greater at the proximal end 138 than the distal end 140. The auger 102 includes a helical blade 142 radially extending from the central shaft 136. The auger 102 further includes a powering mechanism 144 (e.g., electric, hydraulic, or the like) configured to power the auger 102 to rotate about an auger central axis $A_2$. As shown in FIGS. 5 and 8, the auger central axis $A_2$ can be offset from and substantially parallel to the central longitudinal axis $A_1$ of the hood 106 such that the auger 102 is not centrally positioned on the hood 106. In some embodiments, the auger central axis $A_2$ can be angled in the direction of the central longitudinal axis $A_1$. The distal end 140 of the auger 102 can be mounted to the front planar wall 130 of the recessed area 122, and the proximal end 138 of the auger 102 can be mounted to the proximal top surface 118 of the hood 106.

The tall corn attachment 104 generally includes a leading edge 146 defining a top, curved edge of the tall corn attachment 104. The leading edge 146 extends between a proximal end 148 and a distal end 150 of the tall corn attachment 104. The tall corn attachment 104 includes first and second side surfaces 152, 154 and a base 156 defining the bottom of the tall corn attachment 104. The leading edge 146 defines a curved surface that tapers from a first width 158 at the distal end 150 to a second width 160 at the proximal end 148.

In some embodiments, the first width 158 can be dimensioned greater than the second width 160. In some embodiments, as shown in FIGS. 7 and 8, the second width 160 can be dimensioned greater than the first width 158. In some embodiments, the distal end 150 of the tall corn attachment 104 (including the leading edge 146 and the first and second side surfaces 152, 154) can be dimensioned wider than the proximal end 148 of the tall corn attachment 104, the overall width tapering or narrowing in the direction of the proximal end 148. The wider configuration at the distal end 150 (e.g., a front end) of the tall corn attachment 104 provides a larger and stronger surface for engagement and taking down of large corn stalks.

The first and second side surfaces 152, 154 can taper outwardly from the leading edge 146 to the base 156 such that the base 156 defines a greater width than the leading edge 146. In some embodiments, the leading edge 146, first and second side surfaces 152, 154 and the base 156 can define a hollow inner chamber therebetween and the tapered configuration of the first and second side surfaces 152, 154 provides the structural stability for guiding corn stalks. In some embodiments, the first and second side surfaces 152, 154 can include louvers 162, 164 formed therein. The louvers 162, 164 can be formed as recessed sections in the first and second side surfaces 152, 154. Similar to the louvers 132, the louvers 162, 164 can be angled or curved in the direction of the proximal end 114 and assist in directing loose corn kernels into the collection mechanism of the harvester.

The tall corn attachment 104 includes a pivot axis expending substantially parallel to and offset from the bottom surface or base 156. The tall corn attachment 104 can pivot along the pivot axis between the stored position shown in FIGS. 3-5 and the working position shown in FIGS. 6-8. In particular, the distal end 150 of the tall corn attachment 104 can be mounted to the front planar wall 130 of the hood 106 via a latching mechanism (e.g., a spring-loaded pin) such that the tall corn attachment 104 can be interlocked with the front planar wall 130 when in the working position, and disengaged from the front planar wall 130 when in the stored position. Specifically, the tall corn attachment 104 can be disengaged from the front planar wall 130 and detached from the hood 106 prior to placing the tall corn attachment 102 in the stored position. In the stored position, the tall corn attachment 104 can be received within the recessed area 122 of the hood 106. In the working position, the tall corn attachment 104 can extend from the top surface of the hood 106 to at least partially cover a radial section of the auger 102. In some embodiments, the auger 102 can be configured to automatically stop rotating when the tall corn attachment 104 is positioned in the working position. In some embodiments, the auger 102 can continue to rotate when the tall corn attachment 104 is positioned in the working position.

The leading edge 146 can be separated into a proximal leading edge portion 166, a distal leading edge portion 168, and a rounded, central leading edge top portion 170. The leading edge top portion 170 connects the proximal and distal leading edge portions 166, 168. The proximal and distal leading edge portions 166, 168 extend at angles relative to the pivot axis and the base 156. The angle of the proximal leading edge portion 166 can be greater than the angle of the distal leading edge portion 168, thereby defining a substantially triangular configuration with a rounded top portion 170.

In some embodiments, the tall corn attachment 104 can include a slot 172, 174 formed offset from and extending substantially parallel to the proximal leading edge portion 166. The slot 172, 174 can extend between the first and second side surfaces 152, 154, and can be configured and dimensioned to receive at least a portion of a hand of a user for manipulating the tall corn attachment 104 between the stored position and the working position. In some embodiments, the slot 172, 174 can be formed as a groove that partially extends into the respective first and second side surfaces 152, 154.

FIGS. 9-14 show side, perspective and front views of an alternative embodiment of a divider 200 according to the present disclosure. The divider 200 can be substantially similar in structure and function to the divider 100, except for the distinctions noted herein. Therefore, like reference numbers are used to represent like structures. In particular, rather than including a detachable tall corn attachment 104, the divider 200 includes a non-detachable tall corn attachment 204 configured to be mounted around the shaft 136 of the auger 202 and positionable between a stored position shown in FIGS. 9-11 and a working position shown in FIGS. 12-14. It is noted that the auger central axis $A_2$ and the pivot axis of the tall corn attachment 204 are substantially the same.

The divider 200 includes an L-shaped bracket 206 mounted to the proximal top surface 118 of the hood 106. The bracket 206 includes an aperture that receives therethrough the shaft 136 of the auger 202. The auger 202 includes a radial stop member 208 spaced from the mounting of the bracket 206 and adjacent to the helical blade 142. The distal end 140 of the auger 202 includes a radially narrowed portion 210 for mounting of the tall corn attachment 204. Thus, the distal end 140 of the auger 202 can be mounted into an aperture formed in the front planar wall 130 and the proximal end 138 of the auger 202 can be mounted to the proximal top surface 118 of the hood 106 via the bracket 206.

Rather than including a substantially linear bottom surface or base 156, the tall corn attachment 204 includes proximal and distal mounting flanges 212, 214 extending from the base 156. The mounting flanges 212, 214 can extend substantially perpendicularly from the base 156 and include an aperture configured and dimensioned to receive therethrough the shaft 136 of the auger 202. In particular, the proximal mounting flange 212 includes an aperture dimensioned to fit around the proximal end 138 of the shaft 136 disposed between the bracket 206 and the stop member 208, and the distal mounting flange 214 includes an aperture dimensioned to fit around the narrowed portion 210 of the distal end 140 of the shaft 136. With the tall corn attachment 204 mounted to the shaft 136, the helical blade 142 is disposed between the proximal and distal mounting flanges 212, 214.

A latching mechanism (e.g., a spring-loaded pin, a manually actuated pin, or the like) can be used to engage the proximal and distal mounting flanges 212, 214 with the bracket 206 and the front planar wall 130, respectively, in the working and stored position of the tall corn attachment 204. The tall corn attachment 204 can therefore be rotated into the working position to cover at least a radial portion of the auger 202 while allowing the auger 202 to continue operating or rotating. In some embodiments, upon placement of the tall corn attachment 204 in the working position, the auger 202 can automatically stop operating or rotating.

Figure 15:
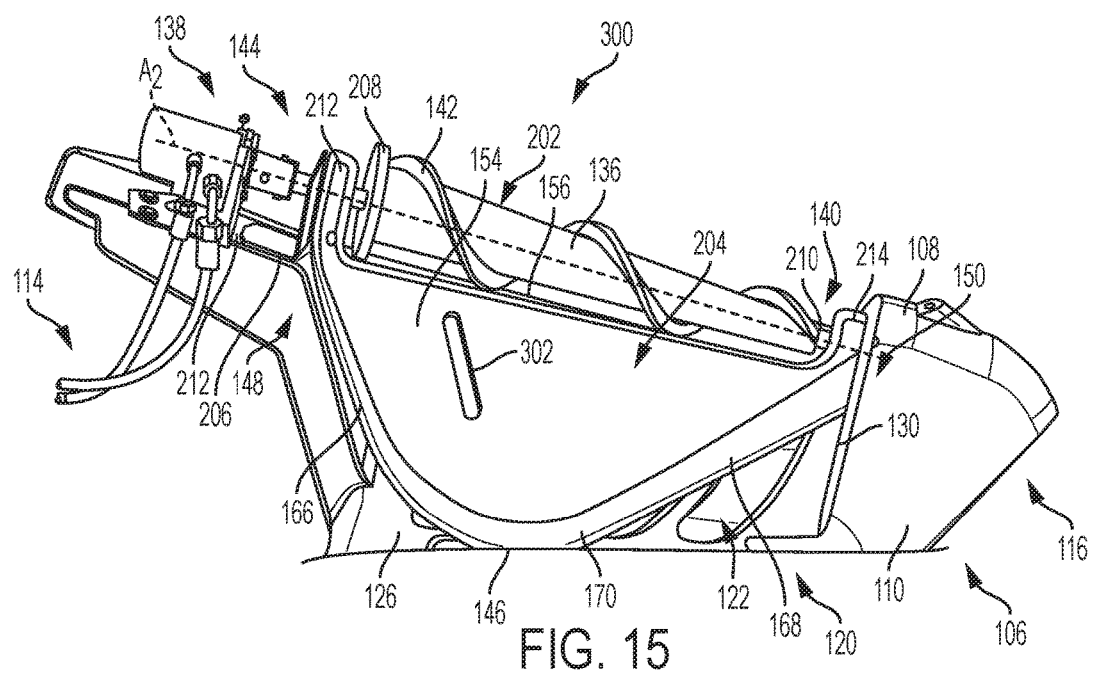
FIG. 15 is a side view of an exemplary divider of the present disclosure including an auger and a non-detachable tall corn attachment, the tall corn attachment being in a stored position.
Figure 16:
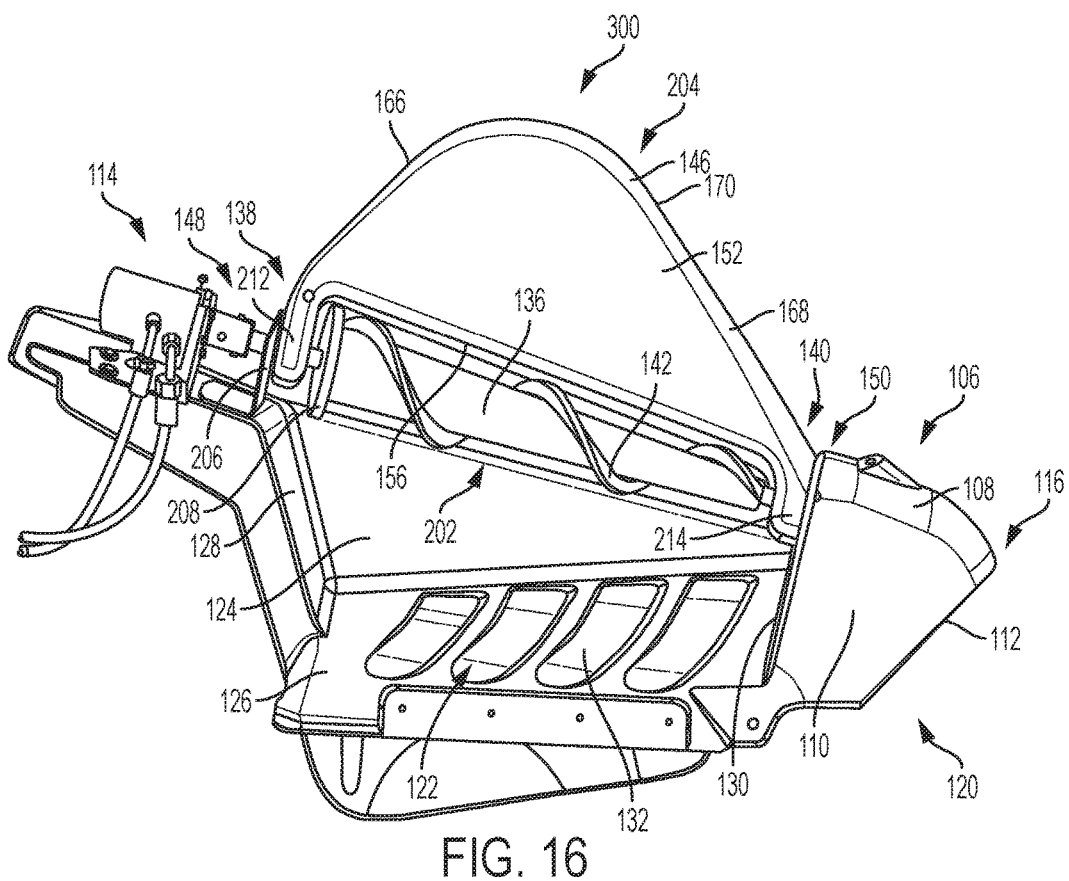
FIG. 16 is a side view of an exemplary divider of FIG. 15 including a non-detachable tall corn attachment in a working position.
Figure 17:
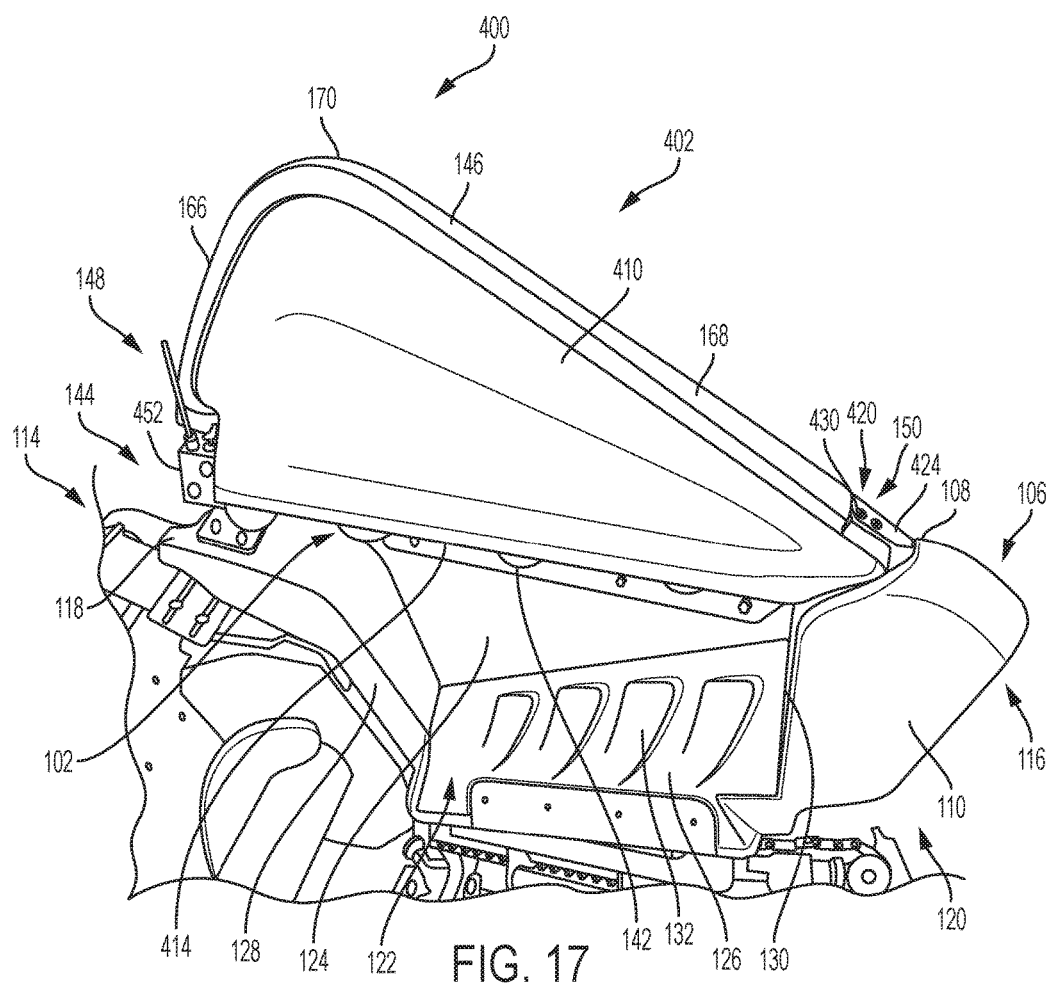
FIG. 17 is a left side view of an exemplary divider of the present disclosure including an auger and a detachable tall corn attachment, the tall corn attachment being in a working position.
Figure 18:
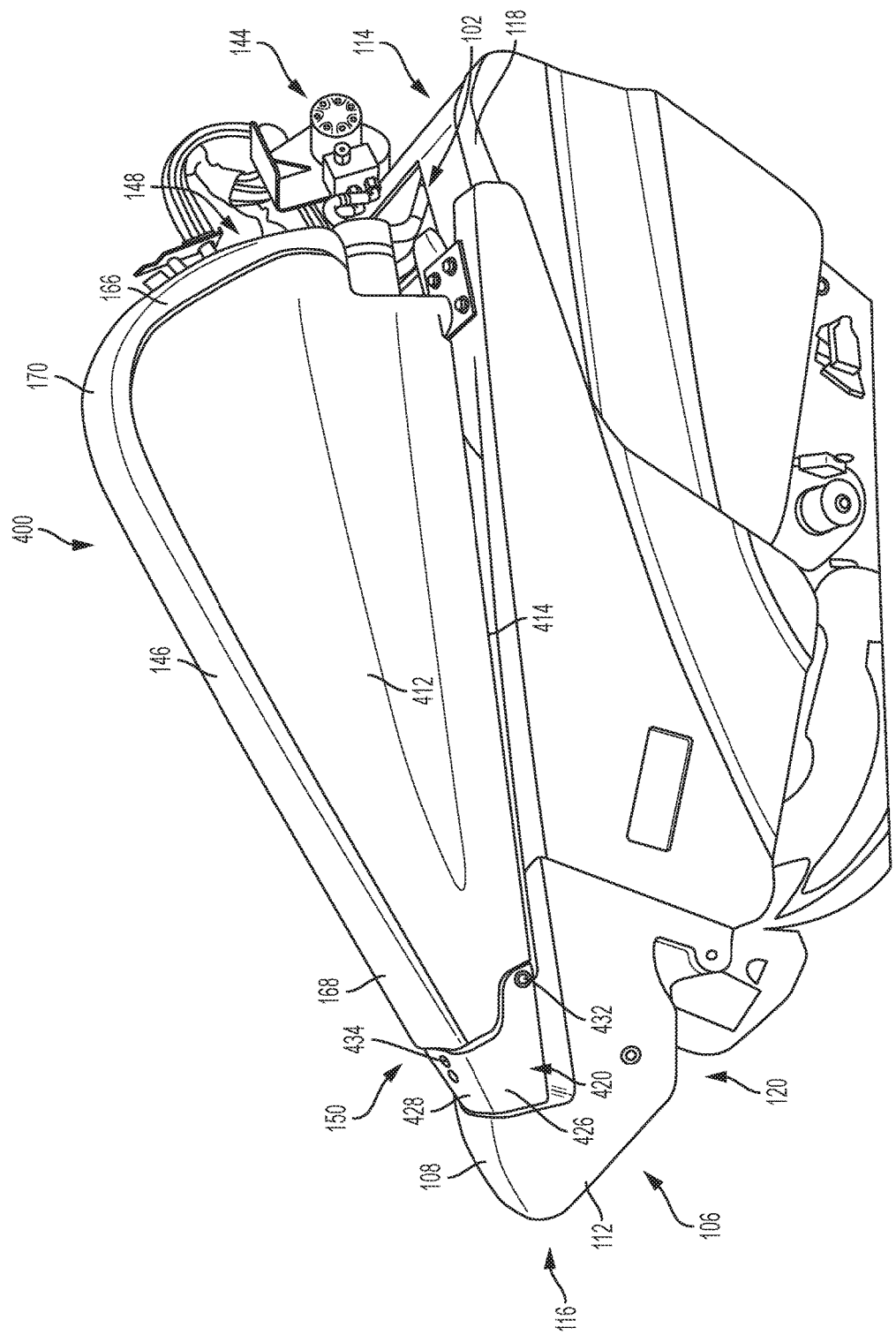
FIG. 18 is a right side view of an exemplary divider of FIG. 17 including a detachable tall corn attachment in a working position.

FIGS. 15 and 16 show an alternative embodiment of an exemplary divider 300 of the present disclosure. The divider 300 can be substantially similar in structure and function to the divider 100, 200, except for the distinctions noted herein. Therefore, like reference numbers are used to represent like structures. In particular, rather than including louvers 162, 164 formed in the first and second side surfaces 152, 154 of the tall corn attachment 204, the first and second side surfaces 152, 154 can define substantially planar surfaces. In addition, rather than including a slot 172, 174 extending through the entire tall corn attachment 204, a groove 302 can be formed in one or both of the first and second side surfaces 152, 154 that only partially extends into the surface of the tall corn attachment 204.

Figure 19:
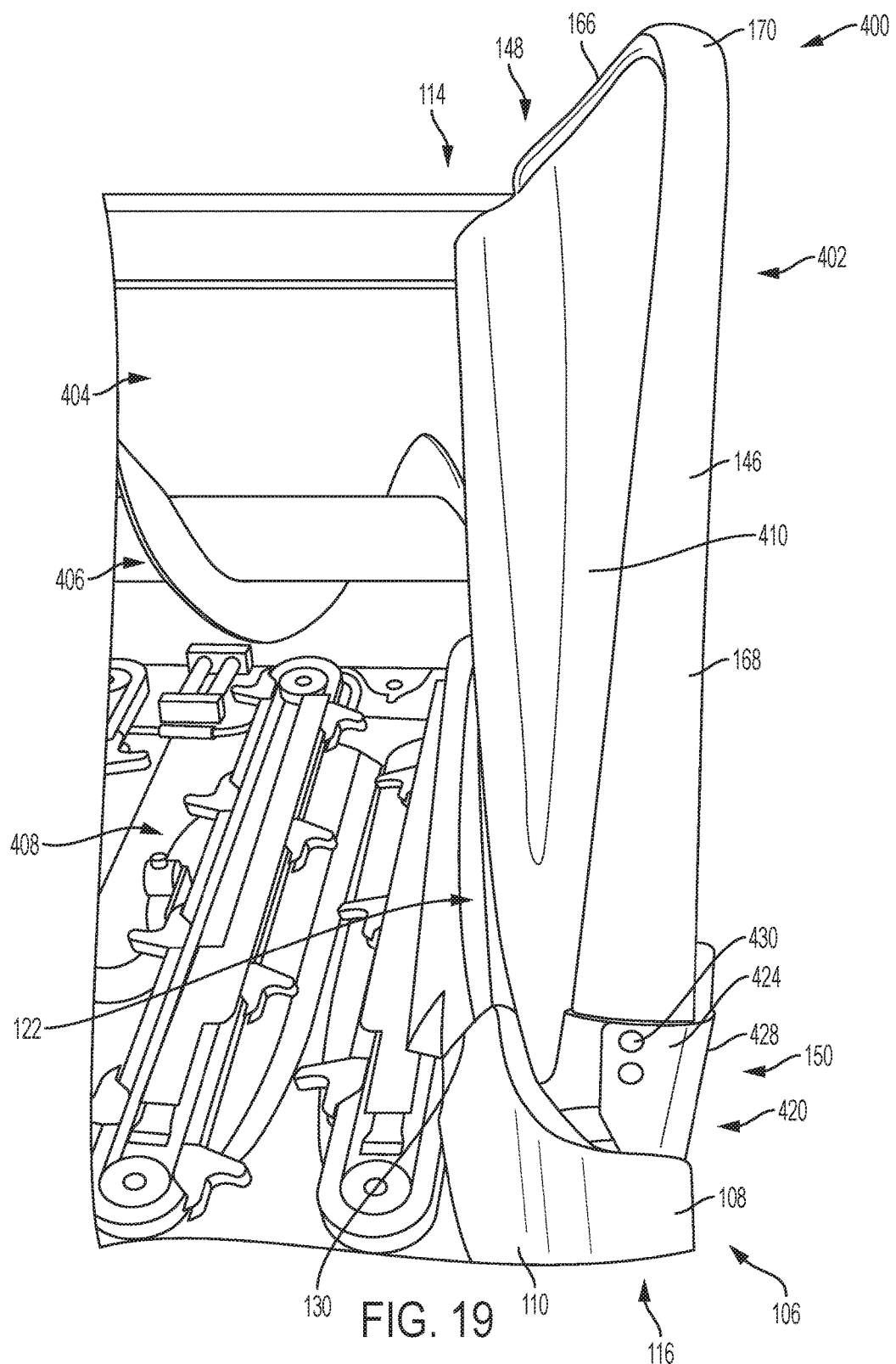
FIG. 19 is a front view of an exemplary divider of FIG. 17 including a detachable tall corn attachment in a working position, the divider being mounted to a corn head.
Figure 20:
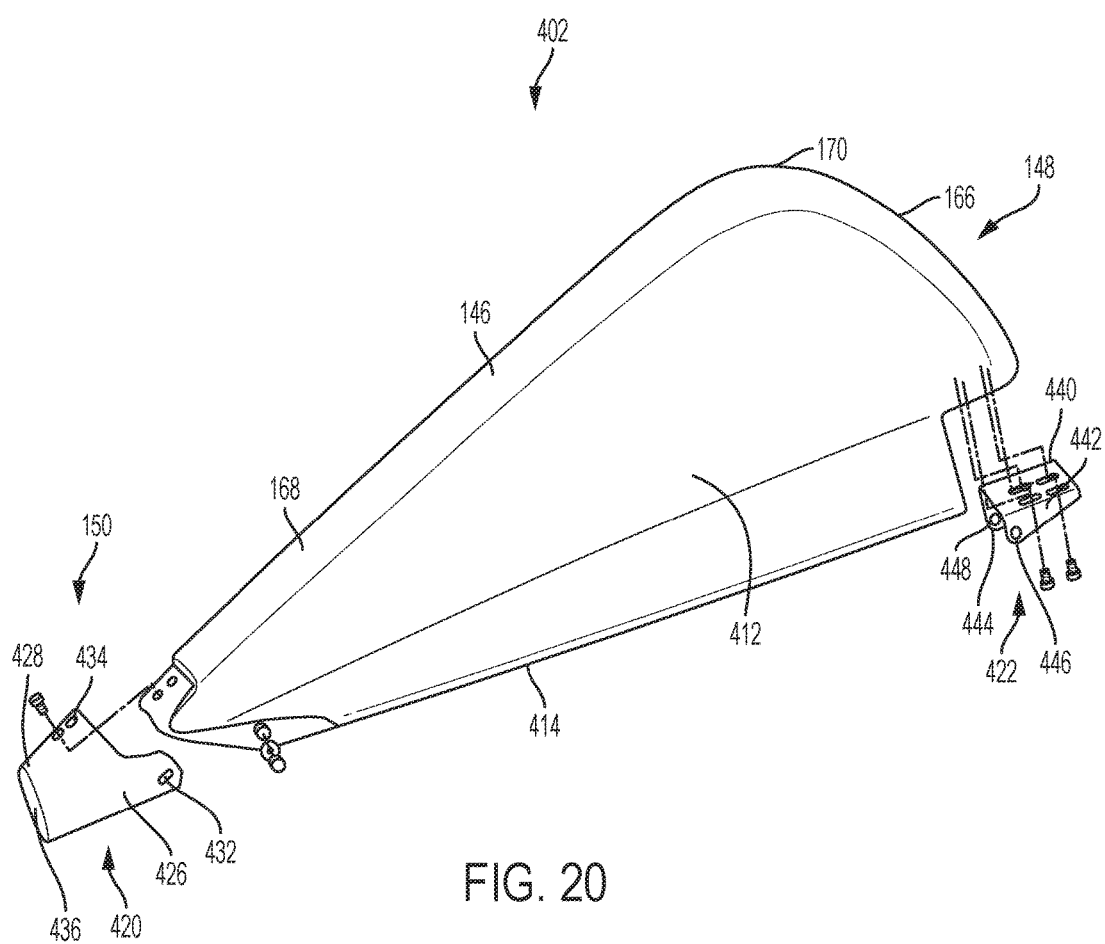
FIG. 20 is a right side, exploded view of an exemplary detachable tall corn attachment of FIG. 17.
Figure 21:
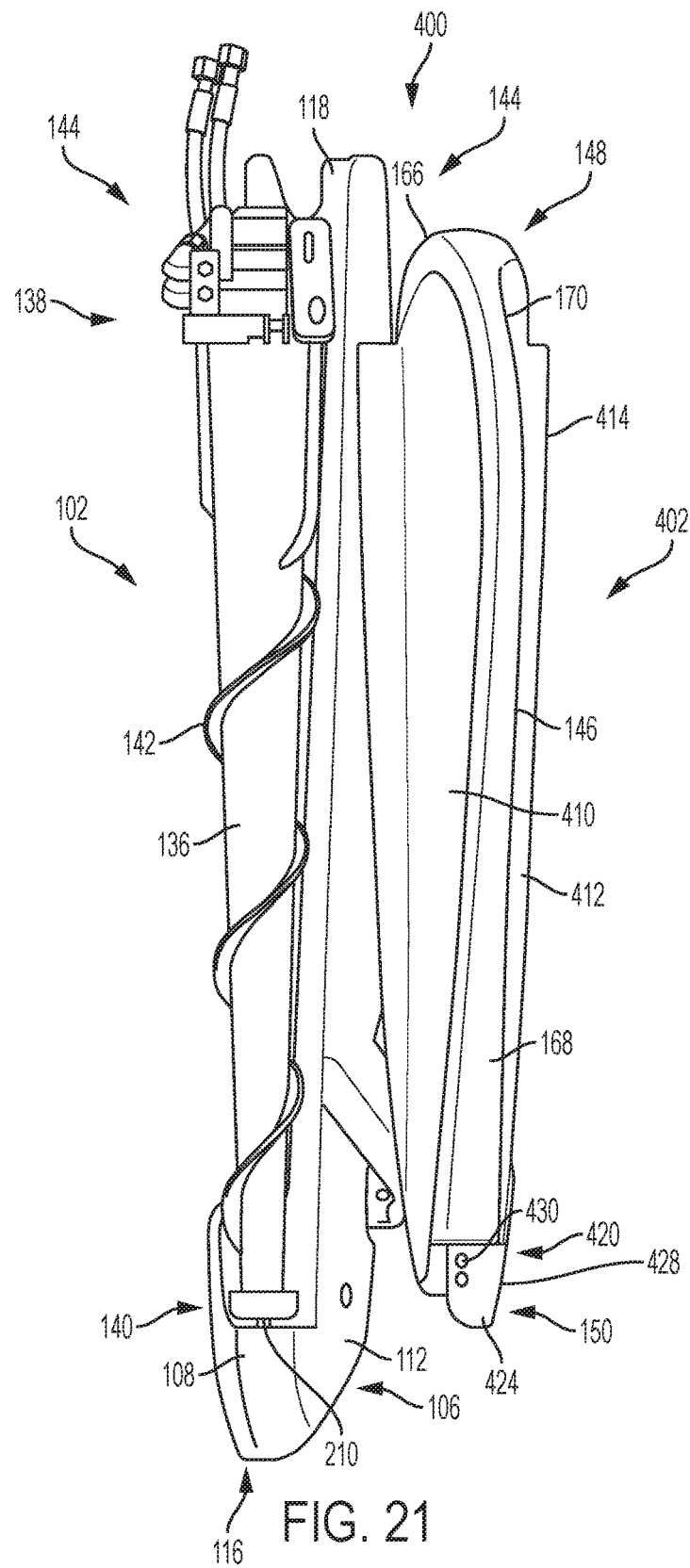
FIG. 21 is a top view of an exemplary divider of FIG. 17 including an auger and a detachable tall corn attachment in a disassembled arrangement.
Figure 22:
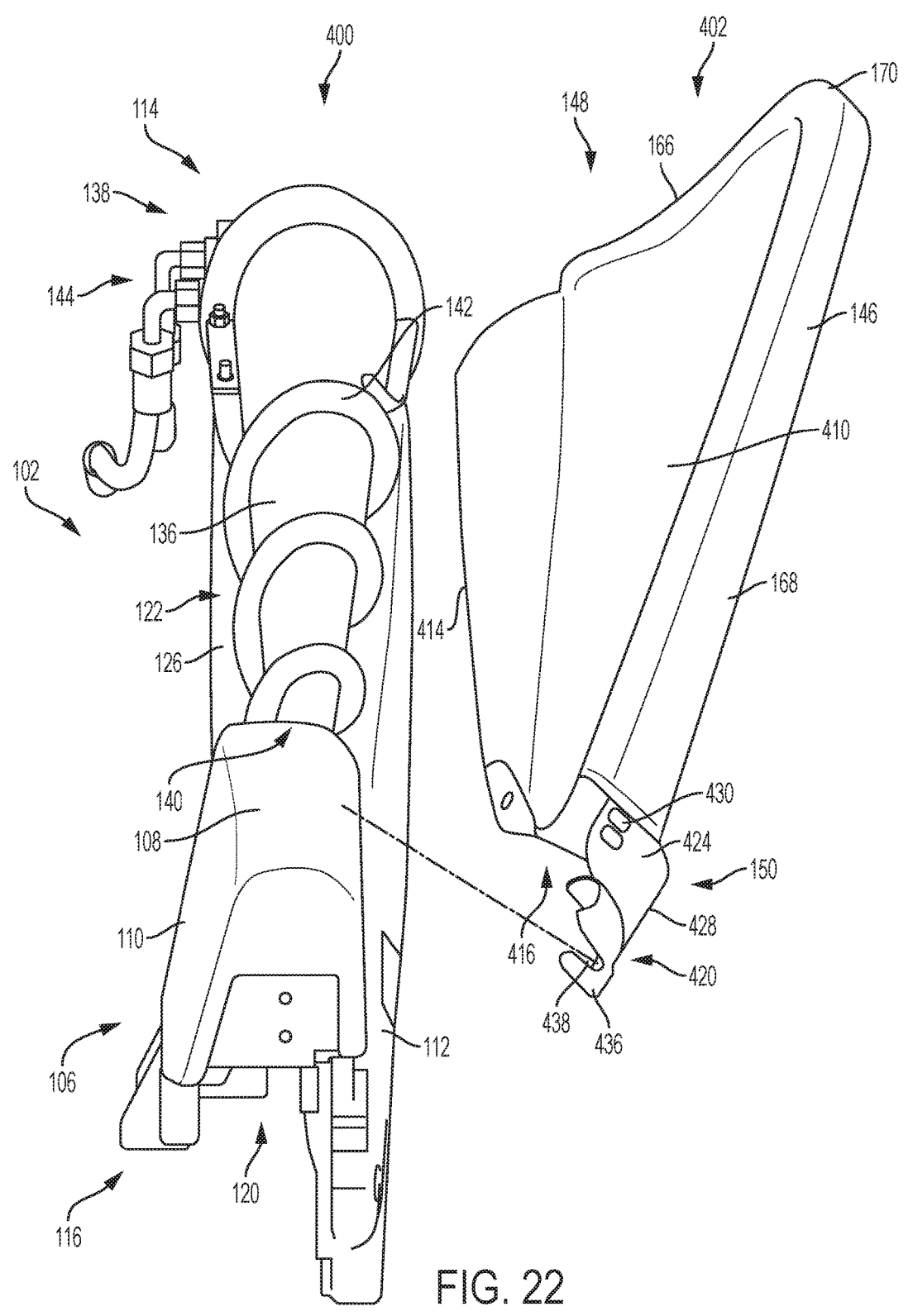
Figure 25:
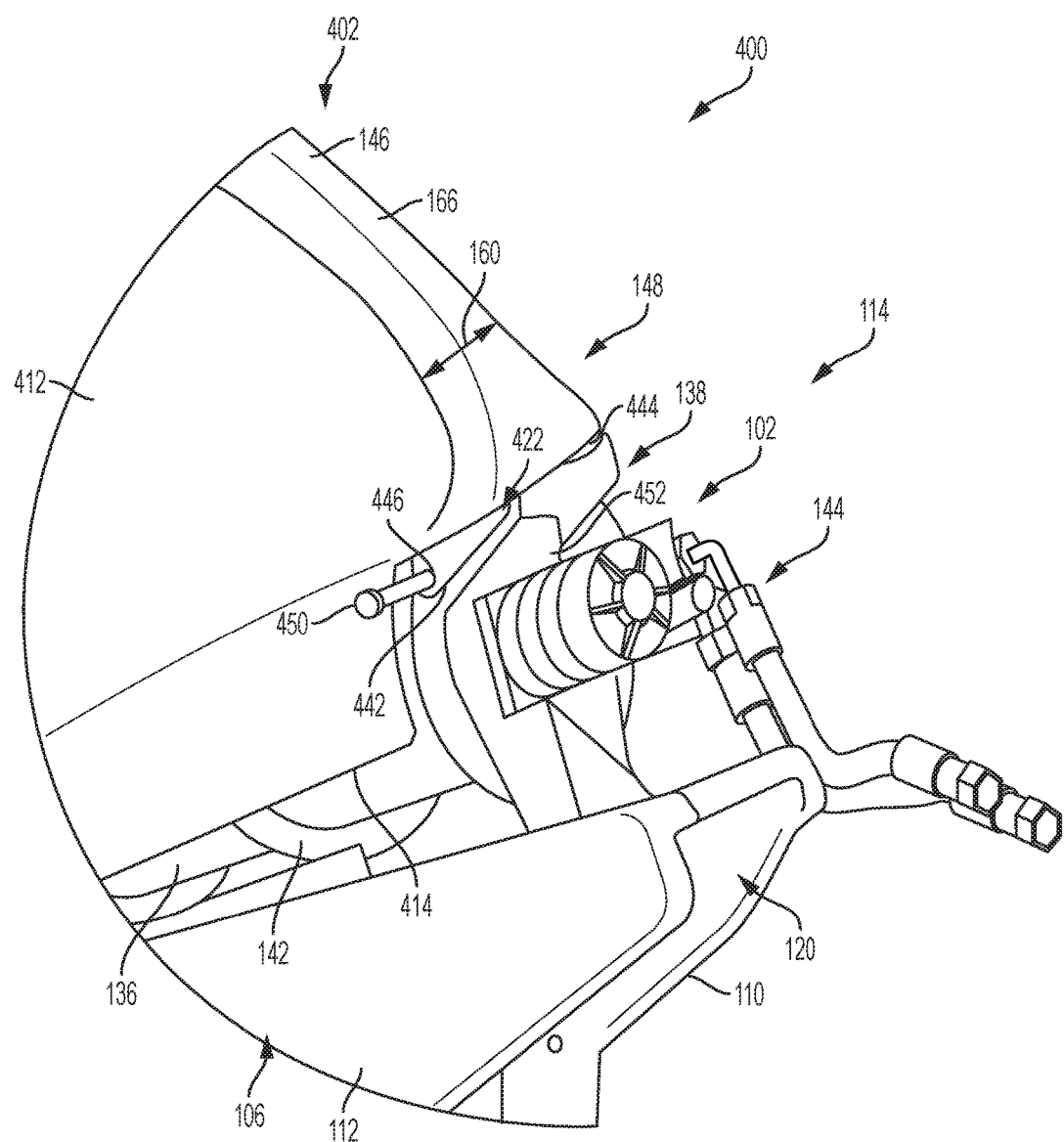
FIG. 25 is a detailed, rear view of an exemplary divider of FIG. 17 including a latching mechanism for mounting a detachable tall corn attachment to the divider.
Figure 26:
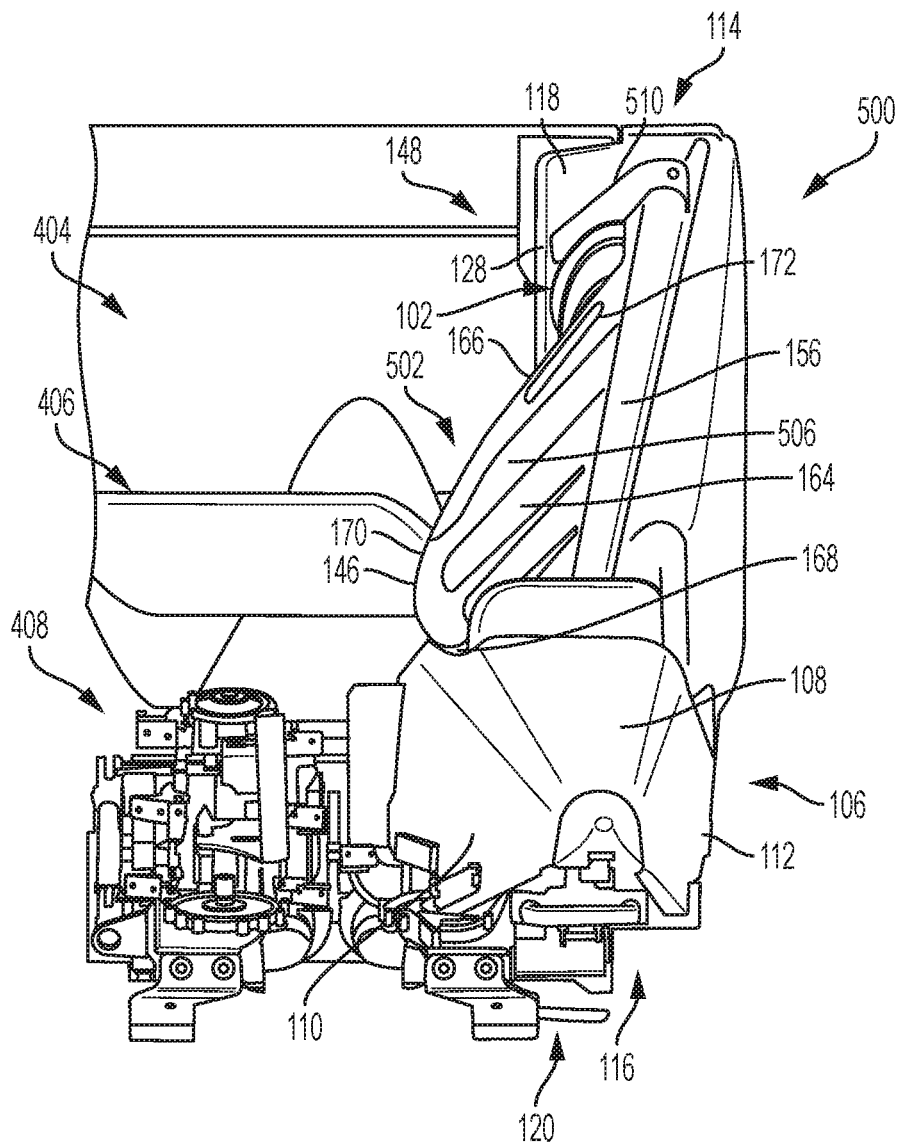
FIG. 26 is a front view of an exemplary divider of the present disclosure including an auger and a detachable tall corn attachment, the tall corn attachment being in a stored position.
Figure 27:
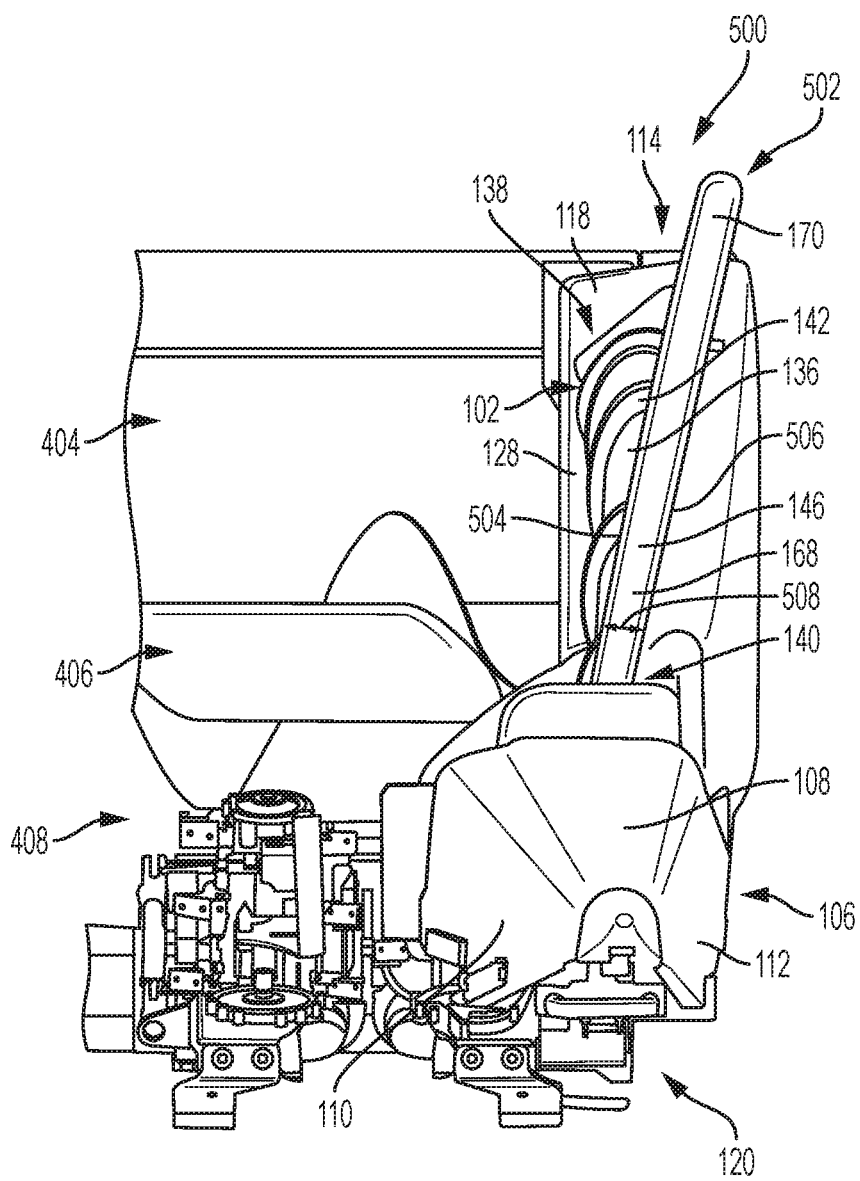
FIG. 27 is a front view of an exemplary divider of FIG. 26 including a detachable tall corn attachment in a working position.
Figure 28:
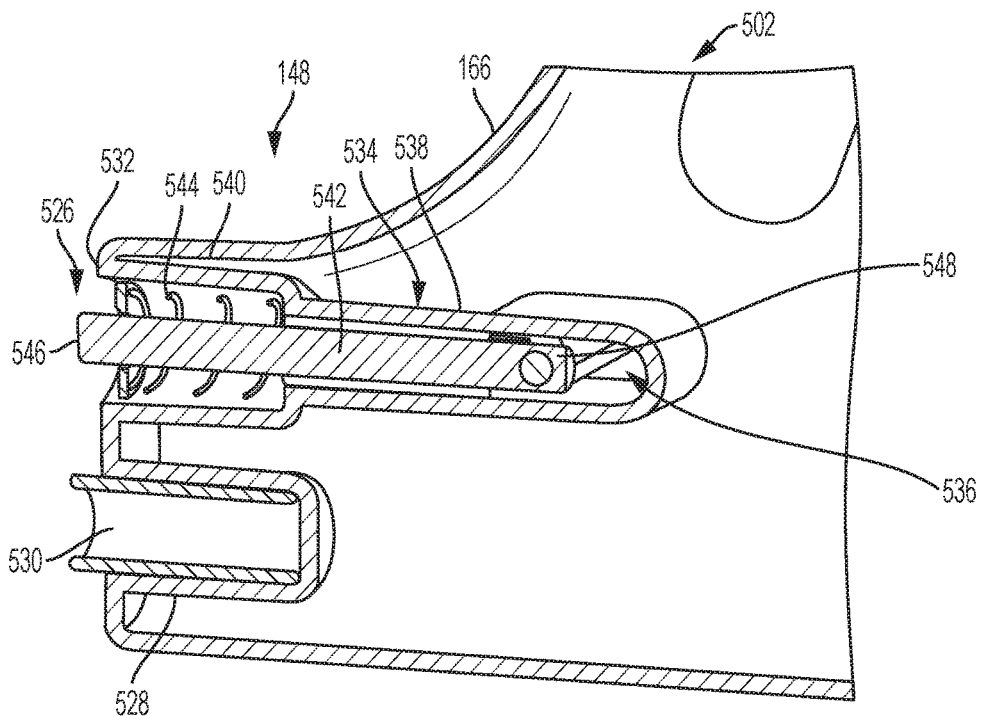
FIG. 28 is a detailed view of an exemplary latching mechanism of the divider of FIG. 26.
Figure 29:
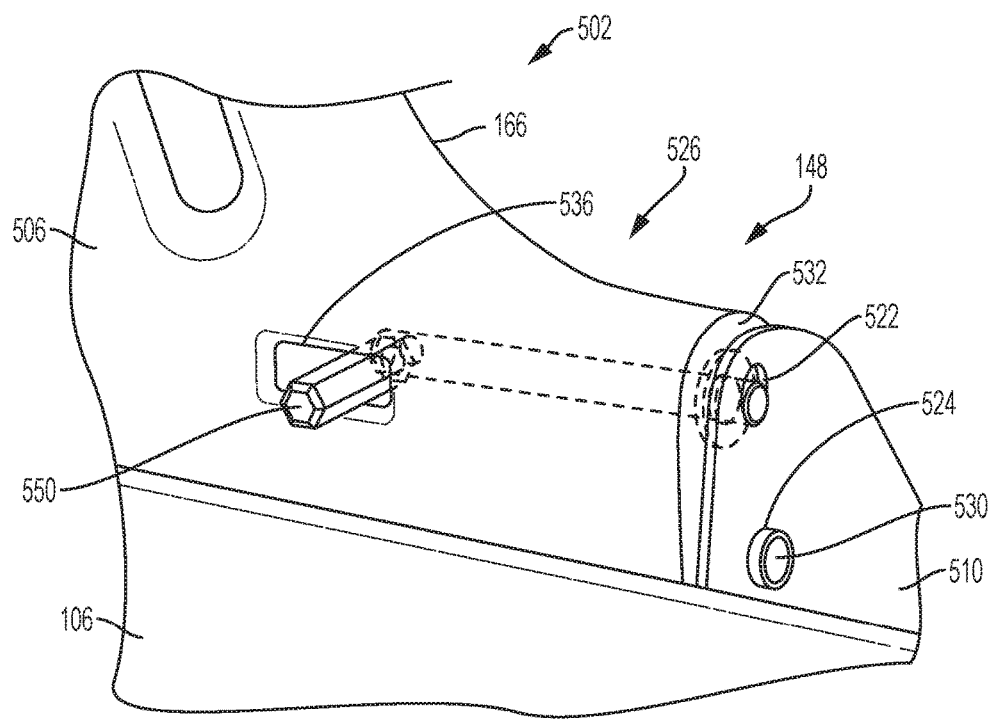
FIG. 29 is a detailed view of an exemplary latching mechanism of the divider of FIG. 26.
Figure 30:
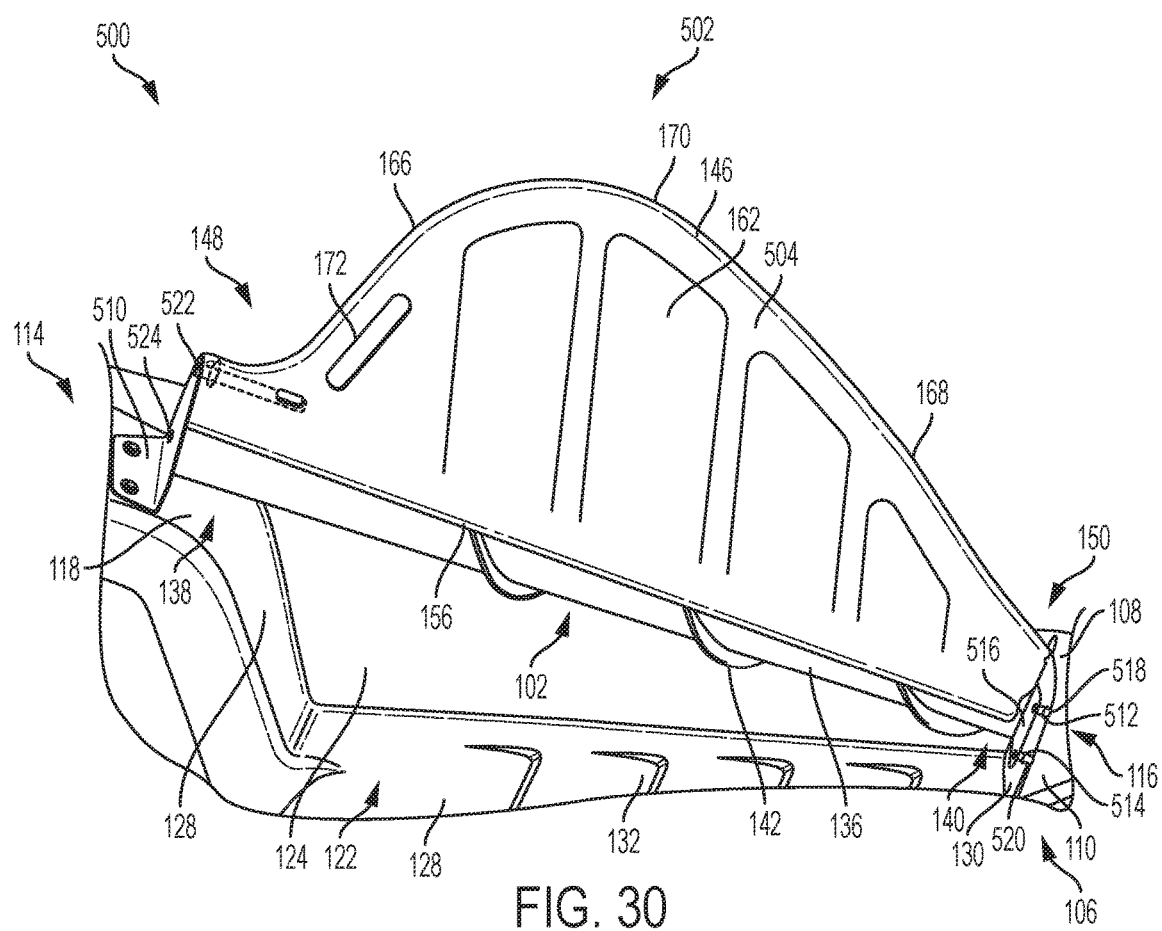
FIG. 30 is a side view of an exemplary divider of FIG. 26 including a detachable tall corn attachment in a working position.

FIGS. 17-25 show an alternative embodiment of an exemplary divider 400 of the present disclosure. The divider 400 can be substantially similar in structure and function to the divider 100, 200, 300 except for the distinctions noted herein. Therefore, like reference numbers are used to represent like structures. As shown in FIG. 19, the divider 400 can be operatively mounted to a corn head 404 including a transverse auger 406 and one or more collection mechanisms 408.

The leading edge 146 of the tall corn attachment 402 can be formed as a unitary structure with the first and second side walls 410, 412 or can be formed as a separate structure that is mounted over the top edge of the first and second side walls 410, 412. The first and second side walls 410, 412 can define smooth, curving surfaces that gradually transition from a narrow width at the leading edge 146 to a wide base 414. The distal width 158 of the leading edge 146 is dimensioned greater than the proximal width 160 and tapers or narrows in the direction of the proximal end 148. The wide leading edge 146 at the distal end 150 of the tall corn attachment 402 and the wide base 414 (relative to the leading edge 146) provides structural strength to the tall corn attachment 402 for guiding corn stalks engaged during harvesting. The bottom edges of the first and second side walls 410, 412 at the base 414 can be separated from each other to define an opening leading to a hollow interior 418. When assembled with the hood 106, a central longitudinal axis of the tall corn attachment 402 can be substantially aligned with the central longitudinal axis of the hood 106.

The tall corn attachment 402 includes a distal mounting bracket 420 and a proximal mounting bracket 422. The distal mounting bracket 420 can be bolted to the distal end 150 of the tall corn attachment 402, and the proximal mounting bracket 422 can be bolted to the proximal end 148 of the tall corn attachment 402 (e.g., a bottom edge of the proximal end 148). The distal mounting bracket 420 includes a substantially U-shaped configuration including first and second side walls 424, 426 connected at a rounded top wall 428. The first and second side walls 424, 426 include one or more apertures 430, 432 formed therein, and the top wall 428 includes one or more apertures 434, each aperture 430, 432, 434 configured for passage of a fastener for securing the distal mounting bracket 420 to the tall corn attachment 402. The distal mounting bracket 420 includes a front wall 436 with a vertical slot 438 extending from the bottom surface. The vertical slot 438 can be configured and dimensioned to fit over the narrowed portion 210 of the shaft 136 of the auger 102 when the tall corn attachment 402 is assembled with the hood 106.

The proximal mounting bracket 422 defines a substantially U-shaped configuration with a central portion 440 and side walls 442, 444. The side walls 442, 444 can define a triangular or tapering configuration. Each of the side walls 442, 444 includes an aperture 446, 448 formed therein for passage of a pin 450 (e.g., a spring-loaded pin, a manually actuated pin, or the like). The proximal mounting bracket 422 can be secured to the proximal end 148 of the tall corn attachment 402, and the pin 450 can detachably interlock the proximal mounting bracket 422 to a complementary bracket 452 disposed on the hood 106. The tall corn attachment 402 can thereby be detachably mounted to the hood 106 to cover the entire top radial portion of the auger 102. Upon removal of the pin 450 from the proximal mounting bracket 422, the tall corn attachment 402 can be pivoted in an upward direction along the distal mounting bracket 420, and the distal mounting bracket 420 can be disengaged from the shaft 136 to detach the tall corn attachment 402 from the hood 106.

FIGS. 26-30 show front, detailed and side views of an alternative embodiment of an exemplary divider 500 of the present disclosure. The divider 500 can be substantially similar in structure and function to the divider 100, 200, 300, 400, except for the distinctions noted herein. Therefore, like reference numbers are used to represent like structures. In particular, the divider 500 includes a tall corn attachment 502 with first and second side walls 504, 506 that are substantially planar and extend define a substantially uniform width 508 from the leading edge 146 to the base 156.

In addition, the proximal and distal ends 148, 150 of the tall corn attachment 502 include a latching mechanism for detachably securing the tall corn attachment 502 to a proximal mounting bracket 510 and the front planar wall 130. The front planar wall 130 includes first and second apertures 512, 514 formed therein. The distal end 150 of the tall corn attachment includes a front wall 516 including two pins 518, 520 protruding therefrom. During assembly, the pins 518, 520 can be introduced into the apertures 512, 514 to create two pivot points that maintain the tall corn attachment 502 in the working position.

The proximal mounting bracket 510 includes two apertures 522, 524. The proximal end 148 includes a latching mechanism 526 including a first longitudinal passage 528 housing a first pin 530 extending therefrom. It should be understood that the latching mechanism 526 can be used in the alternative embodiments of the tall corn attachment described herein. The pin 530 protrudes from the rear surface 532 of the tall corn attachment 502. The latching mechanism 526 further includes a second longitudinal passage 534 formed in the rear surface 532 and extending parallel to the first longitudinal passage 528. The second longitudinal passage 534 communicates with a lateral passage 536 (e.g., an elongated slot) extending through the second side surface 506 to form a substantially right angle. The second longitudinal passage 534 includes a first portion 538 and a second portion 540. The first portion 538 defines a diameter dimensioned smaller than the second portion 540, and connects with the lateral passage 536.

The second longitudinal passage 534 receives therein an elongated pin 542 and a spring 544. The spring 544 is disposed within the second portion 540 of the second longitudinal passage 534 and maintains the pin 542 biased partially out of the rear surface 532 (e.g., the proximal end 546 extends out of the rear surface 532). The distal end 548 of the pin 542 is coupled to a lateral pin 550 that extends out of the lateral passage 536. The lateral pin 550 can travel within the elongated lateral passage 536 while simultaneously biasing the spring 544. In particular, sliding the lateral pin 550 in the distal direction biases the spring 544 to retract the proximal end 546 of the pin 542 into the second longitudinal passage 534. Releasing the lateral pin 550 allows the biasing force of the spring 544 to extend the proximal end 546 of the pin 542 out of the second longitudinal passage 534.

During assembly, after the pins 518, 520 at the distal end 150 have been engaged with the apertures 512, 514 of the front planar wall 130, the pin 530 can be inserted into the aperture 524 on the mounting bracket 510. Next, the spring-loaded pin 542 can be retracted, aligned with the aperture 522 of the mounting bracket 510, and released to engage the aperture 522. Thus, the tall corn attachment 502 can be detachably secured in the working position. To detach to tall corn attachment 502 from the hood 106, the pin 542 can be retracted into the second longitudinal passage 534, the proximal end 148 can be disengaged from the mounting bracket 510, and the distal end 150 can be disengaged from the front planar wall 130. The tall corn attachment 502 can further be received within the recessed area 122 in the stored position.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

The invention claimed is:

1. A corn harvester, comprising:
a corn head including a plurality of dividers, each divider including a hood with a top surface, first and second side surfaces, a proximal end and a distal end, one of the first or second side surfaces including a recessed area formed therein;
an auger mounted to the hood, the auger configured to be powered to rotate about an auger central axis; and
a tall corn attachment mounted to the hood and rotatable about the auger central axis to be positioned in a stored position or a working position, wherein in the stored position the tall corn attachment is received within the recessed area of the hood, and wherein in the working position the tall corn attachment extends from the top surface of the hood and at least partially covers a radial section of the auger;
wherein the tall corn attachment includes a latching mechanism for locking the tall corn attachment in the stored position or the working position.

2. The corn harvester of claim 1, wherein the recessed area of the hood is complementary to the configuration of the tall corn attachment.

3. The corn harvester of claim 1, wherein the recessed area of the hood includes a planar side wall offset from a central longitudinal axis of the hood and extending between the proximal and distal ends of the hood, and a front planar wall located near the distal end of the hood.

4. The corn harvester of claim 3, wherein a distal end of the auger is mounted to the front planar wall of the recessed area of the hood and a proximal end of the auger is mounted to the top surface of the hood.

5. The corn harvester of claim 1, wherein in the working position, a bottom surface of the tall corn attachment is disposed over the auger and the tall corn attachment lies on a plane which is substantially parallel to the auger central axis.

6. The corn harvester of claim 5, wherein in the stored position, a bottom surface of the tall corn attachment is disposed below the auger and the tall corn attachment lies on a plane which is substantially parallel to the auger central axis.

7. The corn harvester of claim 1, wherein the auger comprises a powering mechanism configured to automatically stop rotating when the tall corn attachment is positioned in the working position.

8. The corn harvester of claim 1, wherein the latching mechanism comprises a pin extending from a proximal end of the tall corn attachment, the pin configured to be received in an aperture formed in a mounting bracket secured to the top surface of the hood to define a proximal pivot point, the proximal pivot point being located along a pivot axis of the tall corn attachment.

9. The corn harvester of claim 1, wherein the tall corn attachment is detachably mounted to the hood.

10. The corn harvester of claim 1, wherein the auger comprises a shaft extending along the auger central axis, and the tall corn attachment comprises a distal mounting flange extending from a bottom surface of the tall corn attachment and a proximal mounting flange extending from the bottom surface of the tall corn attachment.

11. The corn harvester of claim 10, wherein the tall corn attachment is rotatably and non-detachably mounted to the shaft of the auger by the distal and proximal mounting flanges such that the auger extends between the distal and proximal mounting flanges.

12. The corn harvester of claim 1, wherein the tall corn attachment includes a leading edge extending between a proximal end and a distal end of the tall corn attachment, a base, and first and second side surfaces.

13. The corn harvester of claim 12, wherein the leading edge defines a curved surface tapering from a first width at the distal end to a second width at the proximal end, the first width being dimensioned greater than the second width.

14. The corn harvester of claim 12, wherein each of the first and second side surfaces tapers outwardly from the leading edge to the base.

15. The corn harvester of claim 12, wherein each of the first and second side surfaces includes one or more indented louvers formed therein.

16. The corn harvester of claim 1, wherein the tall corn attachment includes a pivot axis extending parallel and offset from a bottom surface of the tall corn attachment, the tall corn attachment further comprising a proximal leading edge portion and a distal leading edge portion connected by a rounded leading edge top portion.

17. The corn harvester of claim 16, wherein the proximal leading edge portion and the distal leading edge portion extend at angles relative to the pivot axis, the angle of the proximal leading edge portion being greater than the angle of the distal leading edge portion.

18. The corn harvester of claim 16, wherein the tall corn attachment includes a groove formed offset from and extending parallel to the proximal leading edge, the groove being configured and dimensioned to receive at least a portion of a hand of a user.

19. A corn harvester divider, comprising:
a hood with a top surface, first and second side surfaces, a proximal end and a distal end, one of the first or second side surfaces including a recessed area formed therein;
an auger mounted to the hood, the auger configured to be powered to rotate about an auger central axis; and a tall corn attachment mounted to the hood and rotatable about the auger central axis to be positioned in a stored position or a working position, wherein in the stored position the tall corn attachment is received within the recessed area of the hood, and wherein in the working position the tall corn attachment extends from the top surface of the hood and at least partially covers a radial section of the auger;

wherein the tall corn attachment includes a latching mechanism for locking the tall corn attachment in the stored position or the working position.

20. A method of operating a corn harvester, comprising:

providing a corn head including a plurality of dividers, each divider including a hood with a top surface, first and second side surfaces, a proximal end and a distal end, one of the first or second side surfaces including a recessed area formed therein;

mounting an auger to the hood, the auger configured to be powered to rotate about an auger central axis;

mounting a tall corn attachment to the hood;

rotating the tall corn attachment about the auger central axis to position the tall corn attachment in a stored position, wherein in the stored position the tall corn attachment is received within the recessed area of the hood; and rotating the tall corn attachment about the auger central axis to position the tall corn attachment in a working position, wherein in the working position the tall corn attachment extends from the top surface of the hood and at least partially covers a radial section of the auger;

wherein the tall corn attachment includes a latching mechanism for locking the tall corn attachment in the stored position or the working position.

\* \* \* \* \*